US009548955B2

(12) United States Patent
Kubota

(10) Patent No.: US 9,548,955 B2
(45) Date of Patent: Jan. 17, 2017

(54) COMPUTER PRODUCT, CONSOLIDATION SUPPORT METHOD, AND CONSOLIDATION SUPPORT APPARATUS

(71) Applicant: FUJITSU LIMITED, Kawasaki-shi (JP)

(72) Inventor: Atsushi Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 642 days.

(21) Appl. No.: 13/717,763

(22) Filed: Dec. 18, 2012

(65) Prior Publication Data

US 2013/0246540 A1 Sep. 19, 2013

(30) Foreign Application Priority Data

Mar. 14, 2012 (JP) .................................. 2012-057889

(51) Int. Cl.
| | | |
|---|---|---|
| *G06F 15/16* | (2006.01) | |
| *H04L 12/58* | (2006.01) | |
| *G06F 11/30* | (2006.01) | |
| *G06F 11/34* | (2006.01) | |

(52) U.S. Cl.
CPC ........... *H04L 51/26* (2013.01); *G06F 11/3006* (2013.01); *G06F 11/3082* (2013.01); *G06F 11/3093* (2013.01); *G06F 11/3409* (2013.01); *G06F 11/3419* (2013.01); *G06F 11/3452* (2013.01); *G06F 11/3495* (2013.01)

(58) Field of Classification Search
CPC .......... H04L 51/26; H04L 12/58; H04L 12/26; G06F 11/30; G06F 11/3006; G06F 11/3409
USPC .................................. 709/206, 219; 370/252
See application file for complete search history.

(56) References Cited

U.S. PATENT DOCUMENTS

| | | | |
|---|---|---|---|
| 7,577,633 B2 | 8/2009 | Shankar et al. | |
| 7,877,378 B2 | 1/2011 | Gray | |
| 8,024,320 B1 * | 9/2011 | Yehuda | ............. G06F 17/30421 704/10 |
| 2003/0005260 A1 | 1/2003 | Garg et al. | |

(Continued)

FOREIGN PATENT DOCUMENTS

| | | |
|---|---|---|
| JP | 2000-148488 A | 5/2000 |
| JP | 4610240 | 1/2006 |

OTHER PUBLICATIONS

Extended European Search Report dated Jun. 10, 2013 for corresponding European Application No. 12197469.5.

*Primary Examiner* — Tesfay Yohannes
(74) *Attorney, Agent, or Firm* — Fujitsu Patent Center

(57) ABSTRACT

A computer-readable recording medium stores a consolidation support program that causes a computer to execute a process that includes acquiring an electronic message transmitted and received among apparatuses; converting the electronic message into a first electronic message based on a first consolidation rule selected from a consolidation rule group to convert the electronic message by substituting with a specific value, a character string that matches a specific pattern and is included in the electronic message; converting the electronic message into a second electronic message based on a second consolidation rule having a priority rank that is higher than that of the first consolidation rule; determining whether the first and the second electronic messages match; and producing when the first and the second electronic messages do not match, a restrictive condition that the first consolidation rule is to be selected after the second consolidation rule, from the consolidation rule group.

7 Claims, 16 Drawing Sheets

(56) References Cited

U.S. PATENT DOCUMENTS

| | | | |
|---|---|---|---|
| 2005/0100143 A1* | 5/2005 | Bedingfield, Sr. | H04L 12/587 379/88.12 |
| 2005/0273440 A1* | 12/2005 | Ching | G06Q 20/20 705/64 |
| 2005/0289231 A1 | 12/2005 | Harada et al. | |
| 2007/0297391 A1* | 12/2007 | Furukawa | H04L 65/1069 370/352 |
| 2010/0122270 A1 | 5/2010 | Lin | |
| 2010/0218256 A1* | 8/2010 | Thomas | G06F 21/552 726/25 |
| 2011/0267972 A1* | 11/2011 | Yoon | H04L 5/0023 370/252 |
| 2011/0302643 A1* | 12/2011 | Pichna | H04L 63/0892 726/7 |
| 2012/0281688 A1* | 11/2012 | Xu | H04L 5/0048 370/343 |
| 2012/0317211 A1* | 12/2012 | Guo | H04L 65/605 709/206 |
| 2013/0173905 A1* | 7/2013 | Inatomi | H04L 9/0662 713/150 |
| 2013/0246540 A1* | 9/2013 | Kubota | G06F 11/3006 709/206 |

* cited by examiner

FIG.6

600 CONSOLIDATION DEFINITION LIST

| RULE No. | CONSOLIDATION DEFINITION |
|---|---|
| 1 | s/(SELECT\|select).*(FROM\|from)(.*?)(\|).*?(WHERE\|where).*\|$)/SELECT .. FROM $3 $5../ |
| 2 | s/(UPDATE\|update)(.*?)(SET\|set).*\|$)/UPADATE $2 SET../ |
| 3 | s/((INSERT\|insert)¥s*(INTO\|into)(.*?)(VALUES\|values).*?/INSERT INTO $3 VALUES (..)/ |
| 4 | s/(DELETE\|delete)¥s*(FROM\|from)(.*?)(WHERE\|where).*/DELETE FROM $3 WHERE../ |
| 5 | s/^(¥S+¥s){4,4}.*/$1../ |

REVISED CONSOLIDATION DEFINITION LIST ~1000

| RULE No. | CONSOLIDATION DEFINITION |
|---|---|
| 3 | s/(INSERT\|insert) ¥s*(INTO\|into) (.*?) (VALUES\|values) .*/INSERT INTO $3 VALUES (.) / |
| 5 | s/^(¥S+¥s){4,4}.*/$1 ./ |
| 1 | s/(SELECT\|select) .*(FROM\|from) (.*?) (\) .*?\|(WHERE\|where) .*\|$)/SELECT ... FROM $3 $5 ./ |
| 4 | s/(DELETE\|delete) ¥s*(FROM\|from) (.*?) (WHERE\|where) .*/DELETE FROM $3 WHERE ./ |
| 2 | s/(UPDATE\|update) (.*?) (SET\|set) .*\|$) /UPADATE $2 SET ./ |

600-3
600-5
600-1
600-4
600-2

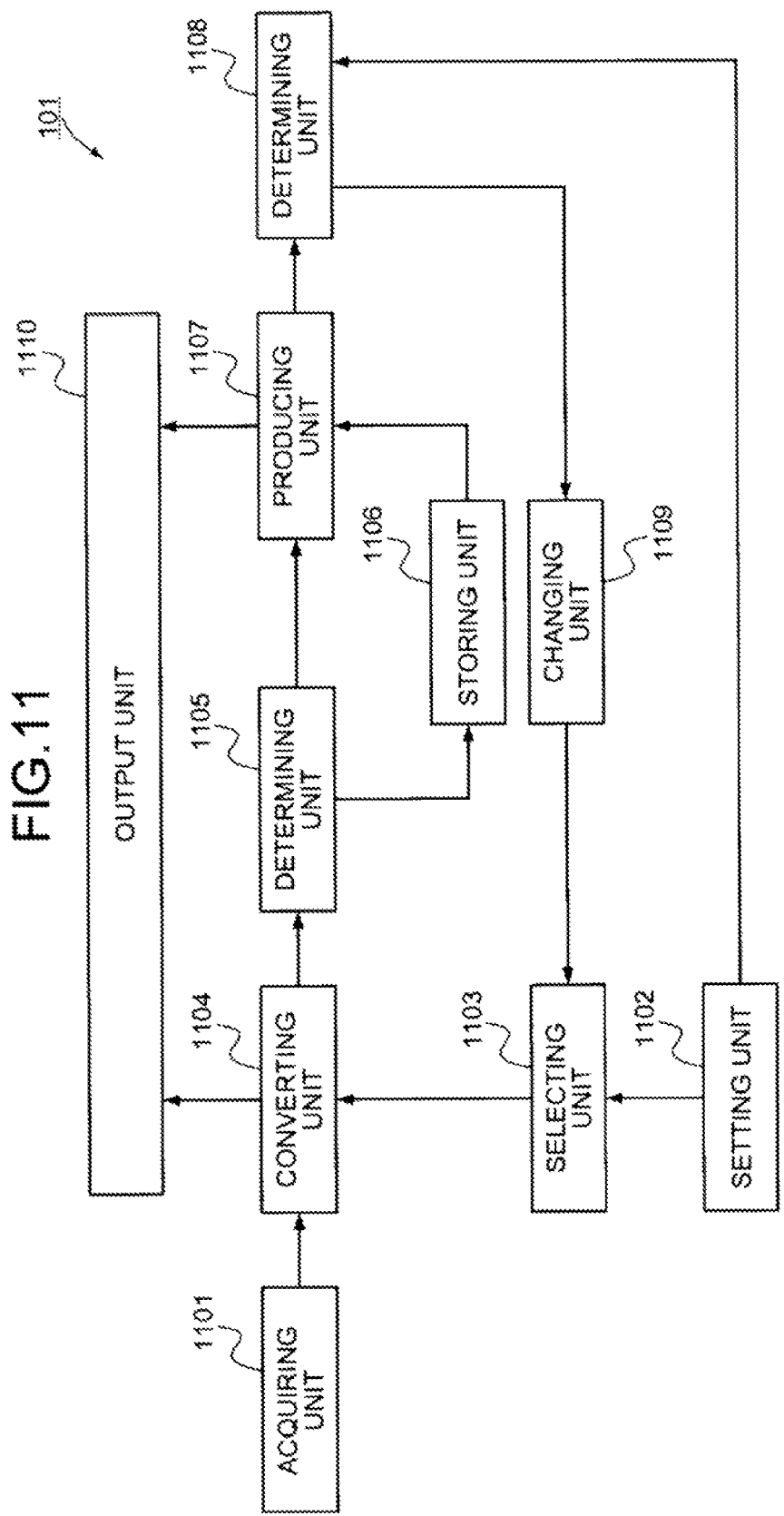

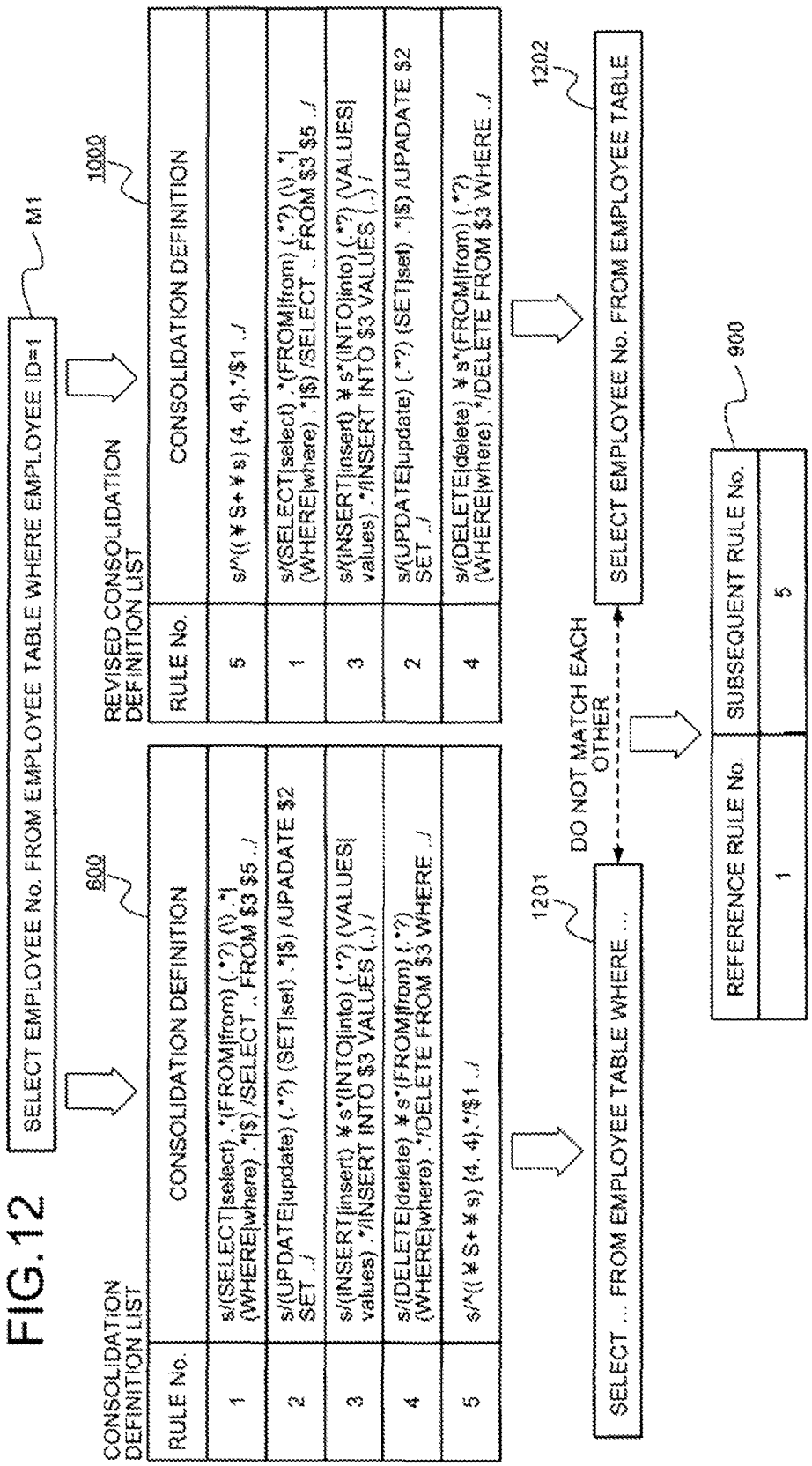

FIG.13A

| RULE No. | CONSOLIDATION DEFINITION |
|---|---|
| 3 | s/(INSERT\|insert) ¥s*(INTO\|into) (.*?) (VALUES\|values) .*/INSERT INTO $3 VALUES (.)/ |
| 5 | s/^((¥S+¥s){4,4}).*/$1 ./ |
| 1 | s/(SELECT\|select) .*(FROM\|from) (.*?) () .*(WHERE\|where) .*/$/SELECT .. FROM $3 $5 ./ |
| 4 | s/(DELETE\|delete) ¥s*(FROM\|from) (.*?) (WHERE\|where) .*/DELETE FROM $3 WHERE ./ |
| 2 | s/(UPDATE\|update) (.*?) (SET\|set) .*/$/UPADATE $2 SET ./ |

FIG.13B

| RULE No. | CONSOLIDATION DEFINITION |
|---|---|
| 5 | s/^((¥S+¥s){4,4}).*/$1 ./ |
| 1 | s/(SELECT\|select) .*(FROM\|from) (.*?) () .*(WHERE\|where) .*/$/SELECT .. FROM $3 $5 ./ |
| 3 | s/(INSERT\|insert) ¥s*(INTO\|into) (.*?) (VALUES\|values) .*/INSERT INTO $3 VALUES (.)/ |
| 4 | s/(DELETE\|delete) ¥s*(FROM\|from) (.*?) (WHERE\|where) .*/DELETE FROM $3 WHERE ./ |
| 2 | s/(UPDATE\|update) (.*?) (SET\|set) .*/$/UPADATE $2 SET ./ |

FIG.14A

| RULE No. | CONSOLIDATION DEFINITION |
|---|---|
| 5 | s/^((¥S+¥s){4,4}.*/$1../ |
| 1 | s/(SELECT\|select).*(FROM\|from)(.*?)(\|).*?\|(WHERE\|where).*\|($)/SELECT .. FROM $3 $5../ |
| 3 | s/(INSERT\|insert)¥s*(INTO\|into)(.*?)(VALUES\|values).*/INSERT INTO $3 VALUES (..) / |
| 4 | s/(DELETE\|delete)¥s*(FROM\|from)(.*?)(WHERE\|where).*/DELETE FROM $3 WHERE ../ |
| 2 | s/(UPDATE\|update)(.*?)(SET\|set).*\|$)/UPADATE $2 SET ../ |

FIG.14B

| RULE No. | CONSOLIDATION DEFINITION |
|---|---|
| 5 | s/^((¥S+¥s){4,4}.*/$1../ |
| 1 | s/(SELECT\|select).*(FROM\|from)(.*?)(\|).*?\|(WHERE\|where).*\|($)/SELECT .. FROM $3 $5../ |
| 3 | s/(INSERT\|insert)¥s*(INTO\|into)(.*?)(VALUES\|values).*/INSERT INTO $3 VALUES (..) / |
| 2 | s/(UPDATE\|update)(.*?)(SET\|set).*\|$)/UPADATE $2 SET ../ |
| 4 | s/(DELETE\|delete)¥s*(FROM\|from)(.*?)(WHERE\|where).*/DELETE FROM $3 WHERE ../ |

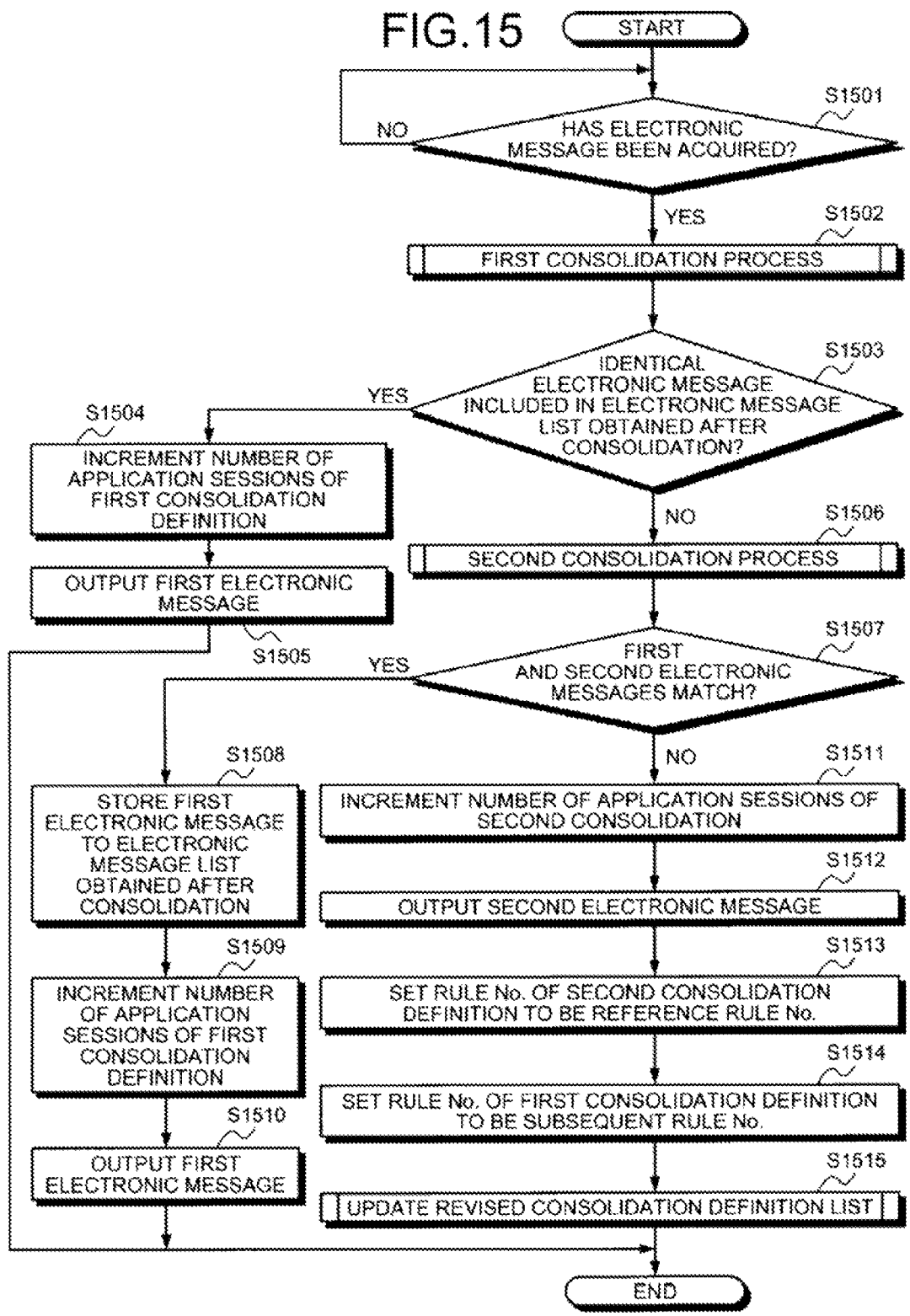

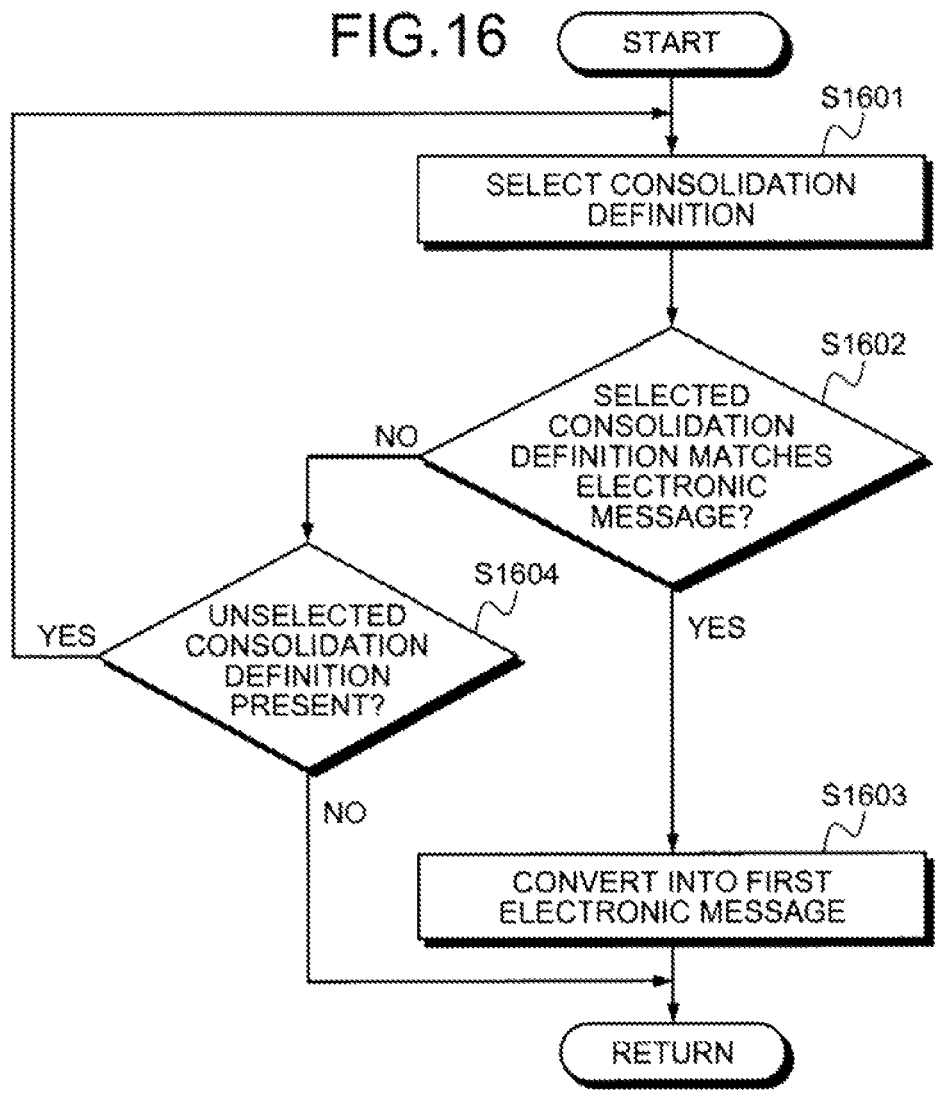

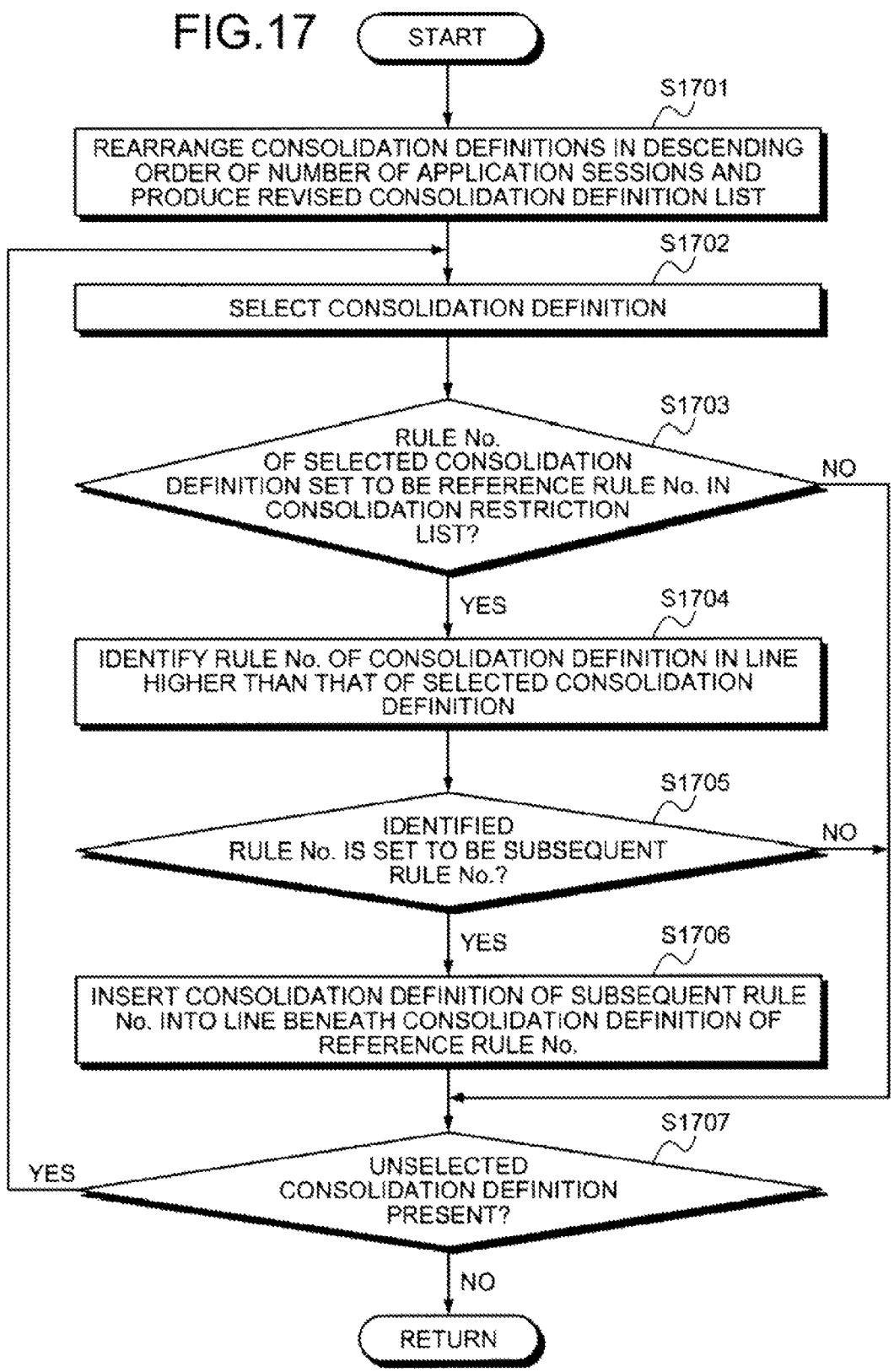

COMPUTER PRODUCT, CONSOLIDATION SUPPORT METHOD, AND CONSOLIDATION SUPPORT APPARATUS

CROSS REFERENCE TO RELATED APPLICATIONS

This application is based upon and claims the benefit of priority of the prior Japanese Patent Application No.2012-057889, filed on Mar. 14, 2012, the entire contents of which are incorporated herein by reference.

FIELD

The embodiments discussed herein are related to a consolidation support program, a consolidation support method, and a consolidation support apparatus.

BACKGROUND

A technique is conventionally known according to which the number of transmission sessions, processing time periods, etc. of electronic messages transmitted and received among apparatuses in a system are statistically processed and thereby, the states of the apparatuses in the system are monitored. When the electronic messages are statistically processed, a user may wish to classify and process the electronic messages by function, object to be handled, etc. Therefore, each of the electronic messages may foe converted into a form suitable for statistical processing using delimiters, regular expressions, etc. Hereinafter, the conversion of each of the electronic messages into an electronic message in a form suitable for the statistical processing may be expressed as "consolidation".

When the consolidation is executed for the electronic message, for example, a user prepares in advance a list of consolidation definitions to convert the electronic message; and an apparatus that executes a consolidation process compares sequentially in order of the definitions listed, the consolidation definitions with the electronic message and outputs the conversion result of the consolidation definition that first matches the electronic message. The user may change the order in which the consolidation definitions defined in the list are applied to the electronic messages to improve the efficiency of the consolidation process, etc.

Prior arts relating to the above are, for example, a technique of monitoring a database system without connecting to the database system; a technique of analyzing the processing time periods of transactions executed among servers in a system; a technique of converting an event and a log issued by an application into a common form to be managed; and a technique of enabling concurrent execution of plural orders by preventing, for example, data dependence (see, e.g., Japanese Laid-Open Patent Publication Nos. 2006-338415, 2004-355650, and 2000-148488, and Japanese Patent Publication No. 4610240).

However, according to the conventional techniques, it is difficult to change the application sequence of the consolidation definitions such that the output result of the consolidation process is not changed even when the application sequence of the consolidation definitions defined in the list, etc. For example, when the output result of the consolidation process is changed by changing the application sequence of the consolidation definitions, determination may be difficult as to whether the consolidation is correctly executed for the electronic messages and the user may not acquire an output result as intended.

SUMMARY

According to an aspect of an embodiment, a computer-readable recording medium stores a consolidation support program that causes a computer to execute a process that includes acquiring an electronic message transmitted and received among apparatuses; converting the acquired electronic message into a first electronic message based on a first consolidation rule selected from a consolidation rule group to convert the electronic message by substituting with a specific value, a character string that matches a specific pattern and is among character strings included in the electronic message; converting the acquired electronic message into a second electronic message based on a second consolidation rule having a priority rank that is higher than a priority rank of the first consolidation rule, a priority rank being given to each of consolidation rules in the consolidation rule group; determining whether the first and the second electronic messages match each other; and producing when the first and the second electronic messages do not match each other, a restrictive condition that a selection sequence of the first consolidation rule comes after a selection sequence of the second consolidation rule, as a restrictive condition to be satisfied by the selection sequence of the first consolidation rule and the selection sequence of the second consolidation rule from the consolidation rule group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram of an example of the contents of a consolidation definition list 600;

FIG. 10 is an explanatory diagram of an example of the contents of a revised consolidation definition list 1000;

FIG. 11 is a block diagram of an example of a functional configuration of the consolidation support apparatus 101;

FIG. 12 is an explanatory diagram of an example of production of a restrictive condition;

FIGS. 13A, 13B, 14A, and 14B are explanatory diagrams of an example of a change of the selection sequence of consolidation definitions;

FIG. 15 is a flowchart of an example of a consolidation support process procedure of the consolidation support apparatus 101;

FIG. 16 is a flowchart of an example of a process procedure of a first consolidation process; and FIG. 17 is a flowchart of an example of a process procedure of an update process of a revised consolidation definition list 1000.

DESCRIPTION OF EMBODIMENTS

Preferred embodiments of the present invention will be explained with reference to the accompanying drawings.

Figure 1:
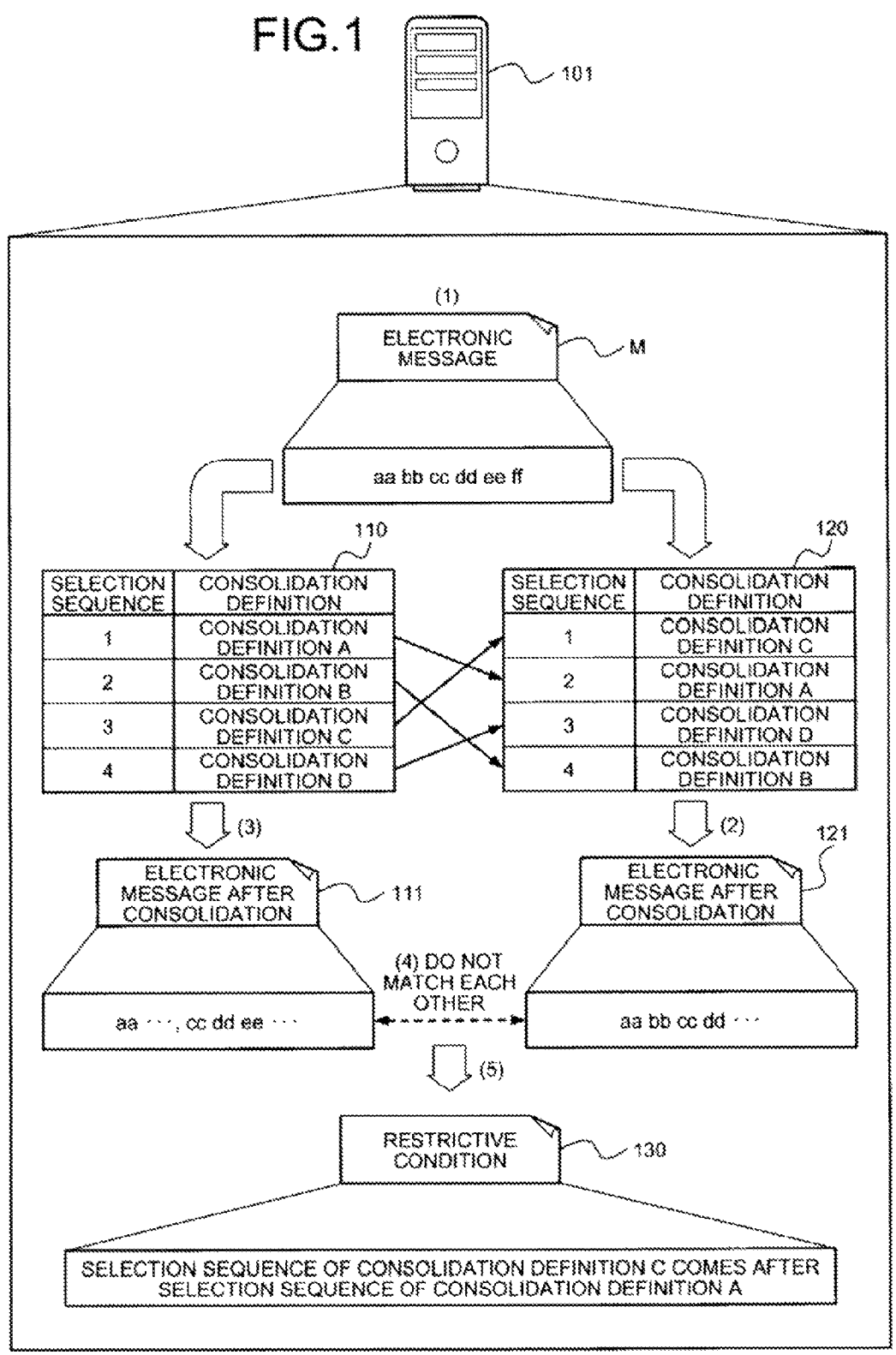
FIG. 1 is an explanatory diagram of an example of a consolidation support method according to an embodiment.

FIG. 1 is an explanatory diagram of an example of a consolidation support method according to the embodiment. In FIG. 1, a consolidation support apparatus 101 is a computer that supports a consolidation process for electronic messages transmitted and received among apparatuses in a system.

The system is, for example, a system whose protocol, has a hierarchical structure. The system is, for example, a system including a web server, an application (AP) server, and a database (DB) server.

The electronic messages are request electronic messages transmitted and received among the apparatuses in the system. The electronic messages are, for example, a structured query language (SQL) statement in a request to the DB server and a uniform resource locator (URL) in a request to the web server.

In the electronic messages, parameters of a URL, the user name included in a SQL statement, etc. may be changed somewhat depending on the client apparatus of the request origin, the time of processing of the electronic message, etc. When the number of transmission sessions of the electronic messages and the processing time periods are statistically processed to monitor the state of each apparatus in the system, it may be desirable to classify the electronic messages by function, object to be operated, etc. and to monitor the state of the apparatuses using a given amount of electronic messages collectively as a unit. Therefore, the consolidation process that converts the electronic messages into electronic messages of a form suitable for statistics, using delimiters, regular expressions, etc. is performed.

In the consolidation process, for example, such operations are executed for the electronic messages as standardization of expression varieties, correction of expression varieties, and separation and division of a character string. For example, processes are executed to standardize expressions such as standardization between 2-byte characters and 1-byte characters, standardization between hypertext markup language (HTML) and HTM. Thereby, each of the electronic messages can be converted into an electronic message of a form by which the identity thereof can be determined by another electronic message, whereby the electronic messages can be classified by function, object to be manipulated, etc.

In the consolidation process, plural consolidation definitions are prepared according to, for example, the purposes of the monitoring. In this case, a consolidation definition is a rule to convert an electronic message by substituting with a specific value, a character string that matches a specific pattern of the character strings included in the electronic message. A priority rank is given to each of the consolidation definitions to, for example, acquire an output result as intended by the user of the consolidation process.

In the consolidation process, for example, the consolidation definitions are compared with the electronic messages sequentially according to the priority rank given to each of the consolidation definitions, and an output result is output based on the consolidation definition that first matches. The matching process is executed only until a consolidation definition is used that first matches the electronic message and thereafter, the matching process of the consolidation definitions is not executed any more.

Therefore, depending on the sequence in which the consolidation definitions are applied to match the electronic messages, the processing time period consumed for matching the consolidation definitions that do not match the electronic messages may increase; the processing time period consumed for the consolidation process may increase; and therefore, the sequence in which the consolidation definitions are applied may be changed. On the other hand, a change in the sequence of application of the consolidation definitions may change the output result of the consolidation process and no output result as intended by the user of the consolidation process may be acquired.

Therefore, when the output results of the consolidation process differ from each other before and after a change in the application sequence of the consolidation definitions, the consolidation support apparatus 101 produces a restrictive condition for the consolidation definitions that are applied to the electronic messages before and after the change, the restrictive condition being that the application sequence of a consolidation definition after the change comes after that of the consolidation definition before the change. Thereby, even when the application sequence of the consolidation definitions is changed thereafter, identification is enabled of the sequence relations among the consolidation definitions for which the output result of the consolidation process is not changed.

An example of a consolidation support process procedure executed by the consolidation support apparatus 101 will foe described below.

In FIG. 1, a list 110 includes consolidation definitions A to D to be applied to the electronic messages and also includes a selection sequence for each of the consolidation definitions A to B based on the priority ranks given thereto; and similar to the list 110, a list 120 includes the consolidation definitions A to D to be applied to the electronic messages and further includes a selection sequence for each of the consolidation definitions A to D based on the frequencies at which the consolidation definitions A to D are applied to the electronic messages.

The "number of application sessions" refers to the number of cases where a consolidation definition matches an electronic message. Changing the application sequence of the consolidation definitions A to D into a sequence in descending order of the number of application sessions, the amount of processing of the matching process executed for the electronic messages can be reduced, whereby the efficiency of the consolidation process can be improved. The application sequence of the consolidation definitions A to D applied to the electronic messages is changed between the lists 110 and 120.

(1) The consolidation support apparatus 101 acquires an electronic message M transmitted and received between the apparatuses in the system. In the example of FIG. 1, an electronic message M "aa bb cc dd ee ff" is acquired that is transmitted and received between the apparatuses in the system.

(2) The consolidation support apparatus 101 compares the consolidation definitions A to D with the electronic messages according to the selection sequence of each of the consolidation definitions A to D in the list 120, and converts the electronic message M based on the consolidation definition that first matches therewith. In the example of FIG. 1, the consolidation definition C first matches and therefore, the electronic message M is converted based on the consolidation definition C into an electronic message 111 "aa bb cc dd . . . " acquired consequent to the consolidation.

(3) The consolidation support apparatus 101 compares the consolidation definitions A to D with the electronic messages according to the selection sequence of each of the consolidation definitions A to D in the list 110, and converts the electronic message M based on the consolidation definition that first matches therewith. In the example of FIG. 1, the consolidation definition A first matches and therefore, the electronic message M is converted based on the consolidation definition A into an electronic message 111 "aa . . . cc dd ee . . . " acquired consequent to the consolidation. In this example, the consolidation definition A is a consolidation definition whose priority rank is higher than that of the consolidation definition C.

(4) The consolidation support apparatus 101 determines whether an electronic message 121 acquired consequent to the consolidation performed by converting the electronic message M and the electronic message 111 acquired consequent to consolidation match each other. In the example of FIG. 1, the electronic message 121 obtained after the consolidation and the electronic message 111 obtained after the consolidation are different from each other and therefore, the consolidation support apparatus 101 determines that the electronic message 121 obtained after consolidation and the electronic message 111 obtained after consolidation do not match each other.

(5) When the consolidation support apparatus 101 determines that the electronic messages 121 and 111 obtained after consolidation do not match each other, the consolidation support apparatus 101 produces a restrictive condition to be satisfied by the selection sequence of the consolidation definition C and by that of the consolidation definition A. In the example of FIG. 1, a restrictive condition 130 is produced according to which the selection sequence of the consolidation definition C comes after the selection sequence of the consolidation definition A.

As described, according to the consolidation support apparatus 101, when the output results of the consolidation process are different from each other before and after a change in the application sequence of the consolidation definitions, a restrictive condition can be produced that is to be satisfied by the consolidation definitions before and after the change applied to the electronic message. In the example of FIG. 1, the consolidation support apparatus 101 can produce the restrictive condition 130 that causes the selection sequence of the consolidation definition C to come after the selection sequence of the consolidation definition A such that the output result of the consolidation process is not changed even when the application sequence of the consolidation definitions is changed. Thereby, thereafter, the sequence relation among the consolidation definitions can be identified for which the output result of the consolidation process is not changed even when the application sequence of the consolidation definitions is changed.

Figure 2:
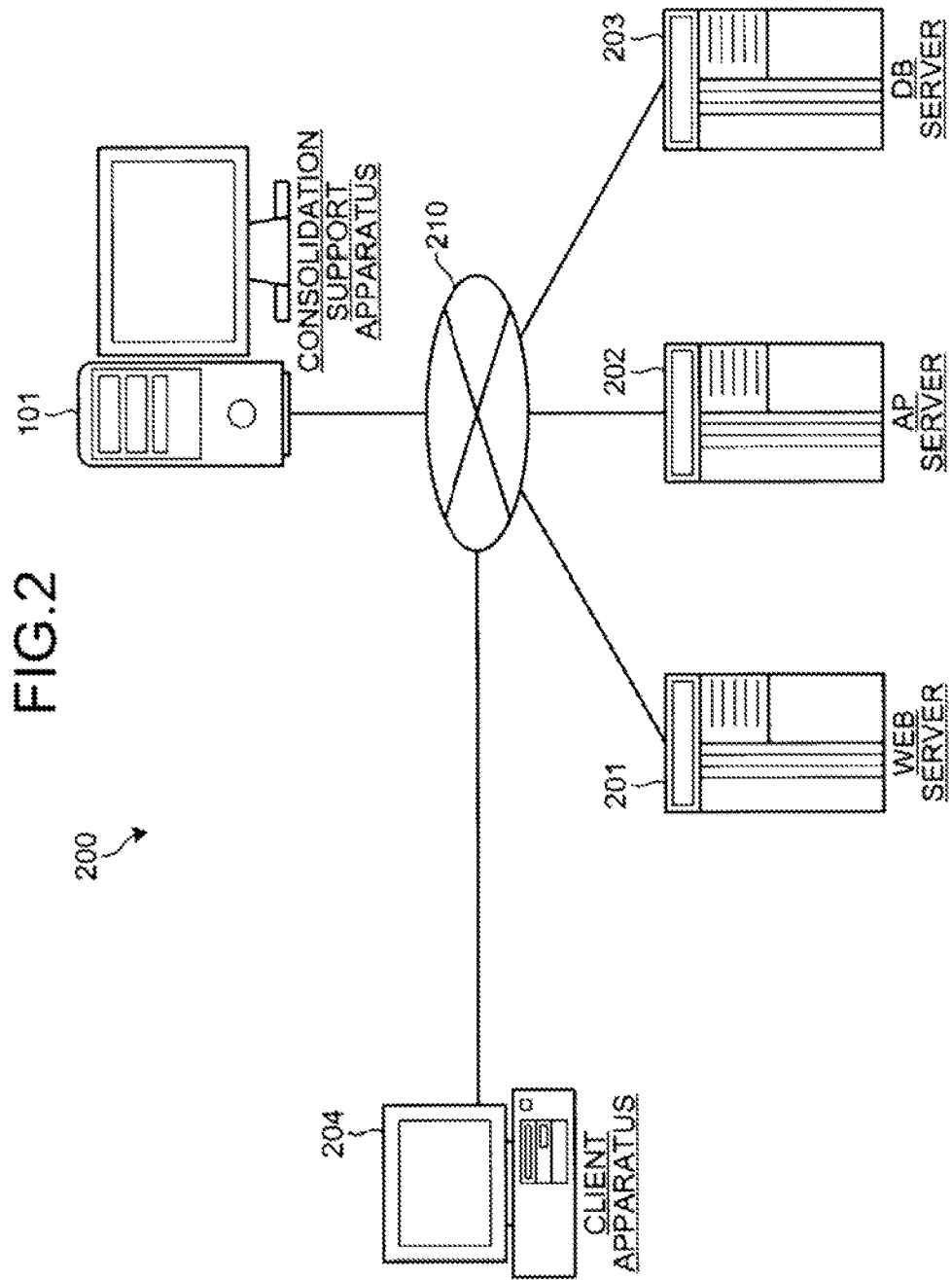
FIG. 2 is an explanatory diagram of an example of a system configuration of a system 200.

A system 200 according to the embodiment will be described. FIG. 2 is an explanatory diagram of an example of a system configuration of the system 200. In FIG. 2, the system 200 includes the consolidation support apparatus 101, a web server 201, an AP server 202, a DB server 203, and a client apparatus 204. In the system 200, the consolidation support apparatus 101, the web server 201, the AP server 202, the DB server 203, and the client apparatus 204 are connected to each other through a wired or radio network 210. The network 210 is, for example, the Internet, a local area network (LAN), or a wide area network (WAN).

A hierarchical structure of the protocol is defined for the system 200. For example, a hyper test transfer protocol (HTTP) is defined for a first hierarchy that is the highest hierarchy. The HTTP is a protocol used for communication between the client apparatus 204 and the web server 201.

An Internet inter-ORB protocol (IIOP) is defined for a second hierarchy. The IIOP is a protocol used for communication between the web server 201 and the AP server 202. An SQL is defined for a third hierarchy that is the lowest hierarchy. The SQL is a protocol used for communication between the AP server 202 and the DB server 203.

The consolidation support apparatus 101 has a capture function of acquiring packets transmitted and received among the apparatuses in the system 200. The consolidation support apparatus 101 analyzes the packets acquired and thereby, can re-configure the electronic messages transmitted and received among the apparatuses in the system 200. The capture function will be described later with reference to FIG. 3.

The web server 201 is a computer that transmits a HTML file in response to a request from a browser mounted on the client apparatus 204. The AP server 202 is a computer that interfaces between the web server 201 and the DB server 203 and that controls a search and update process of the database. The DB server 203 is a computer that executes the search and update process of the database.

Figure 3:
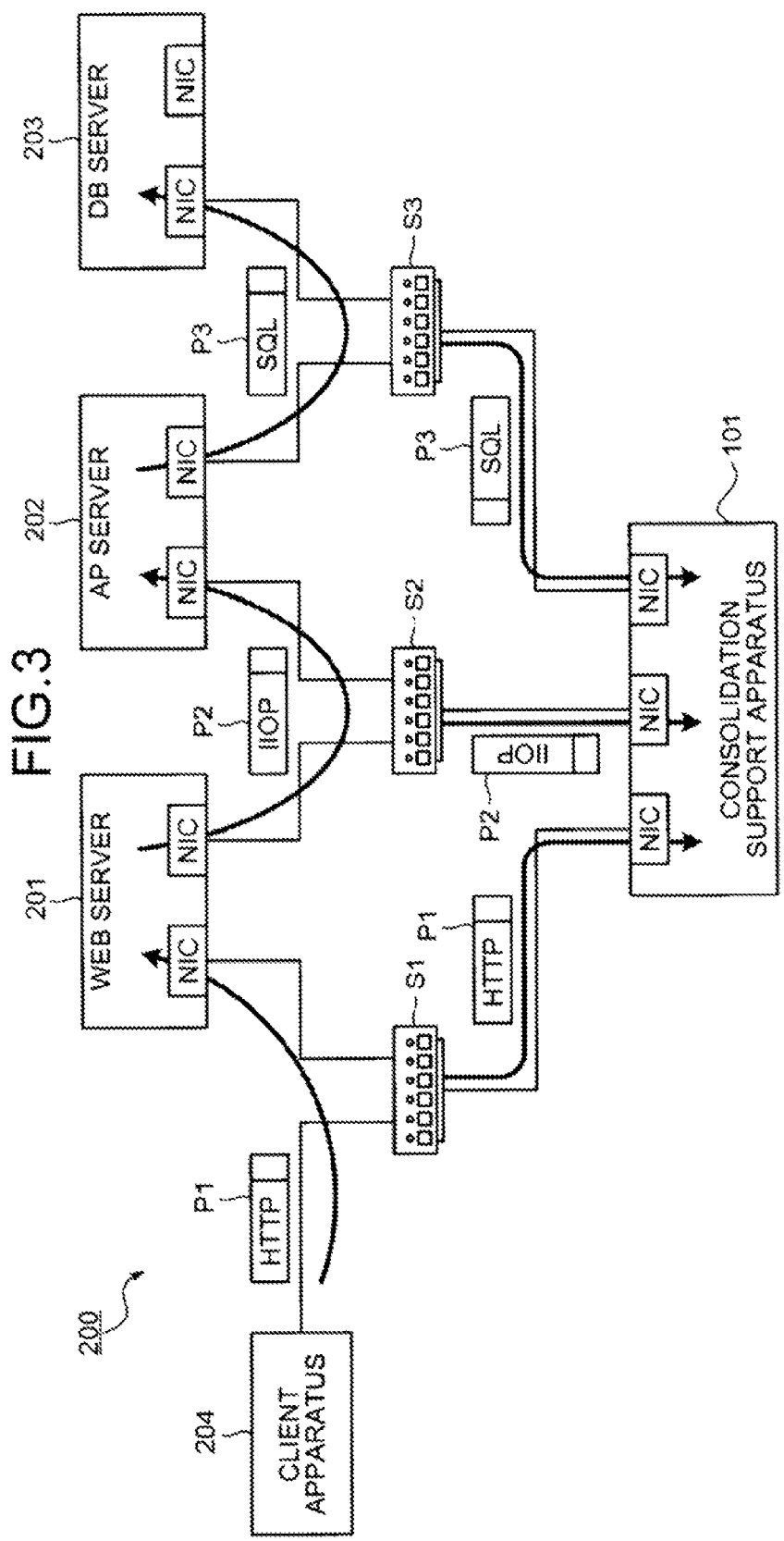
FIG. 3 is an explanatory diagram of an example of a capture function.

FIG. 3 is an explanatory diagram of an example of the capture function. In FIG. 3, packets P1 to P3 based on the various protocols are transmitted and received among the web server 201, the AP server 202, the DB server 203, and the client apparatus 204 through switches S1 to S3 disposed in the system 200.

The consolidation support apparatus 101, the web server 201, the AP server 202, and the DB server 203 are each connected to individual ports of the switches S1 to S3. The switches S1 to S3 each has a function of mirroring the data that passes therethrough. The "mirroring" refers to a function of outputting from another port, same data as data output to the port of the switch S1 to S3.

In this case, a port connected to the consolidation support apparatus 101 is designated as the mirroring destination of the ports connected to the web server 201, the AP server 202, and the DB server 203. Therefore, packets addressed to the servers are input into the respective server and is also input into the consolidation support apparatus 101.

For example, the case is assumed where the web server 201, the AP server 202, and the DB server 203 provide services in cooperation with each other in response to a request from the client apparatus 204. In this case, the client apparatus 204 first transmits the packet P1 to the web server 201.

At this time, another packet P1 having the same content as that of the packet P1 is input into the consolidation support apparatus 101. When the packet P2 is transmitted from the web server 201 to the AP server 202, another packet P2 having the same contents as that of the packet P2 is input into the consolidation support apparatus 101. When the packet P3 is transmitted from the AP server 202 to the DS server 203, another packet P3 having the same contents as that of the packet P3 is input into the consolidation support apparatus 101.

In this manner, the consolidation support apparatus 101 can acquire the packets transmitted and received among the apparatuses in the system 200. Configuration may be such that the consolidation support apparatus 101 acquires only arbitrary packets among the packets transmitted and received among the apparatuses in the system 200.

Figure 4:
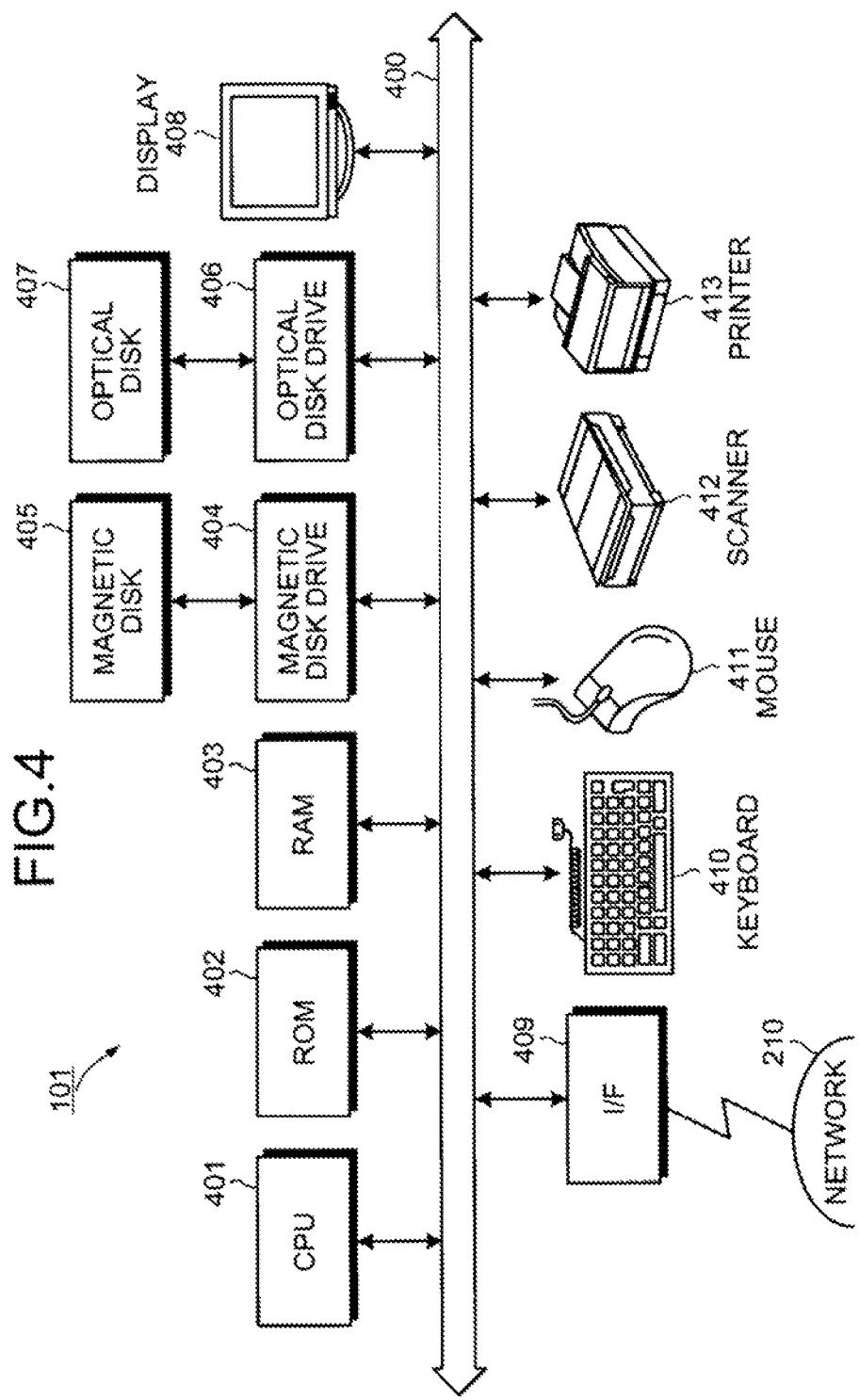
FIG. 4 is a block diagram of a hardware configuration of a consolidation support apparatus 101 according to the embodiment.

FIG. 4 is a block diagram of a hardware configuration of the consolidation support apparatus 101 according to the embodiments. As depicted in FIG. 4, the consolidation support apparatus 101 includes a central processing unit (CPU) 401, a read-only memory (ROM) 402, a random access memory (RAM) 403, a magnetic disk drive 404, a magnetic disk 405, an optical disk drive 406, an optical disk 407, a display 406, an interface (I/F) 403, a keyboard 410, a mouse 411, a scanner 412, and a printer 413, respectively connected by a bus 400.

The CPU 401 governs overall control of the consolidation support apparatus 101. The ROM 402 stores therein programs such as a boot program. The RAM 403 is used as a work area of the CPU 401. The magnetic disk drive 404, under the control of the CPU 401, controls the reading and writing of data with respect to the magnetic disk 405. The magnetic disk 405 stores therein data written under control of the magnetic disk drive 404.

The optical disk drive 406, under the control of the CPU 401, controls the reading and writing of data with respect to the optical disk 407. The optical disk 407 stores therein data written under control of the optical disk drive 406, the data being read by a computer.

The display 408 displays, for example, data such as text, images, functional information, etc, in addition to a cursor, icons, and/or tool boxes. A cathode ray tube (55 CRT), a thin-film-transistor (TFT) liquid crystal display, a plasma display, etc., may be employed as the display 408.

The I/F 409 is connected to the network 210 and is connected to other apparatuses through the network 210. The I/F 409 administers an internal interface with the network 210 and controls the input/output of data from/to external apparatuses. For example, a modem or a LAN adaptor may be employed as the I/F 409.

The keyboard 410 includes, for example, keys for inputting letters, numerals, and various instructions and performs the input of data. Alternatively, a touch-panel-type input pad or numeric keypad, etc. may be adopted. The mouse 411 is used to move the cursor, select a region, or move and change the size of windows.

The scanner 412 optically reads an image and takes in the image data into the consolidation support apparatus 101. The scanner 412 may have an optical character reader (OCR) function as well. The printer 413 prints image data and text data. The printer 413 may be, for example, a laser printer or an ink jet printer.

Configuration may be such that the consolidation support apparatus 101 does not include, for example, the optical disk drive 406, the optical dish 407, the display 408, the keyboard 410, the mouse 411, the scanner 412, and the printer 413.

An example of electronic message information will be described. The electronic message information is information on the electronic messages transmitted and received among the apparatuses in the system 200.

Figure 5:
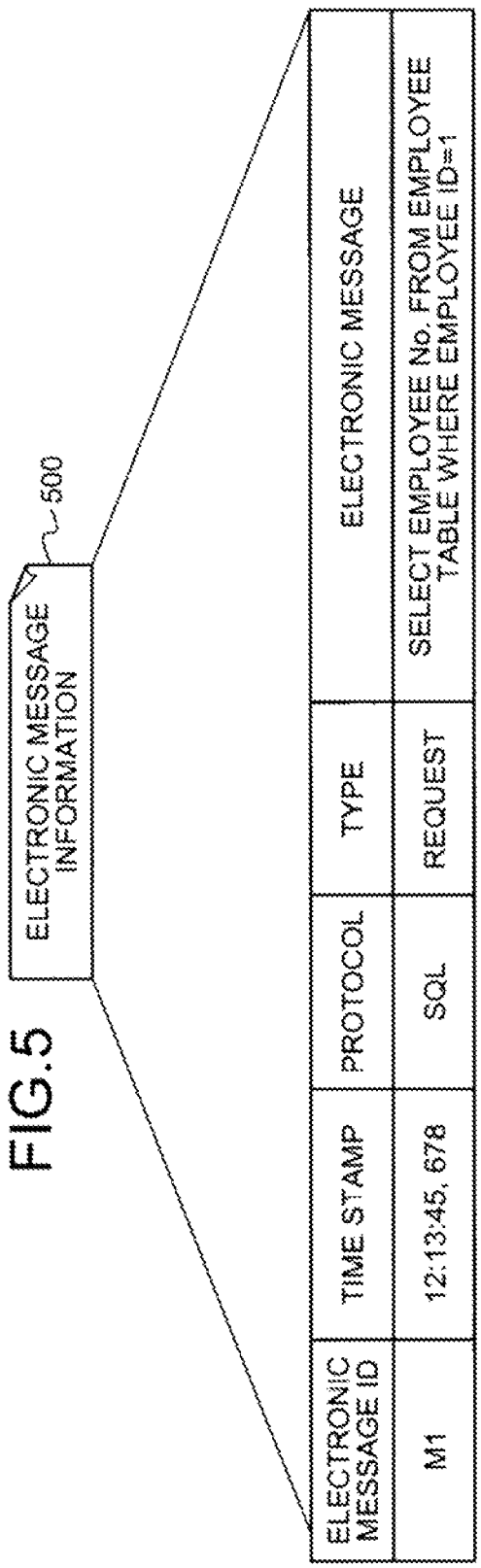
FIG. 5 is an explanatory diagram of an example of electronic message information.

FIG. 5 is an explanatory diagram of an example of the electronic message information. In FIG. 5, the electronic message information 500 includes an electronic message ID, a time stamp, a protocol, a type, and an "electronic message". The electronic message ID is the identifier of the electronic message. The time stamp is information that indicates the transmission time of the electronic message. The protocol is the protocol that is used for the communication among the apparatuses to transmit and receive the electronic message. The "electronic message" is the content of the electronic message transmitted and received among the apparatuses in the system 200.

The contents of a consolidation definition list 600 used by the consolidation support apparatus 101 will be described. The consolidation definition list 600 is stored in a storage apparatus such as the RAM 403, the magnetic disk 405, or the optical disk 407 depicted in FIG. 4.

FIG. 6 is an explanatory diagram of an example of the contents of the consolidation definition list 600. In FIG. 6, the consolidation definition list 600 has fields for "rule No." and "consolidation definition" and stores consolidation definition information 600-1 to 600-5 as records by setting information in the fields.

The "rule No." is the identifier of a consolidation definition. The consolidation definition is a rule to be applied to the electronic message in the consolidation process. In this case, the consolidation definition is the intention of consolidating the electronic messages and is defined as a rule using regular expressions. Each of the consolidation definitions is given a priority rank. In this case, the rule Nos. are given to the consolidation definitions in order of decreasing priority rank. Therefore, the rule No. of the consolidation definition represents the priority rank of the consolidation definition. The priority rank of the consolidation definition is given, for example, to meet the purpose of monitoring the state of each of the servers in the system 200, by the manager of the system 200.

For example, the consolidation definition information 600-1. indicates the consolidation definition of the rule No. "1". The consolidation definition of the rule No. "1" is to execute a consolidation process indicating for which table a SELECT operation is. For example, the consolidation definition information 600-5 indicates the consolidation definition of the rule No. "5". The consolidation definition of the rule No. "5" is to execute a consolidation process of extracting four words from the head of an electronic message and thereby, simplify the electronic message.

The contents of an electronic message list 700 obtained after the consolidation and used by the consolidation support apparatus 101 will be described. The electronic message list 700 obtained after the consolidation is realized by, for example, a storage apparatus such as, for example, the RAM 403, the magnetic disk 405, or the optical disk 407.

Figure 7:
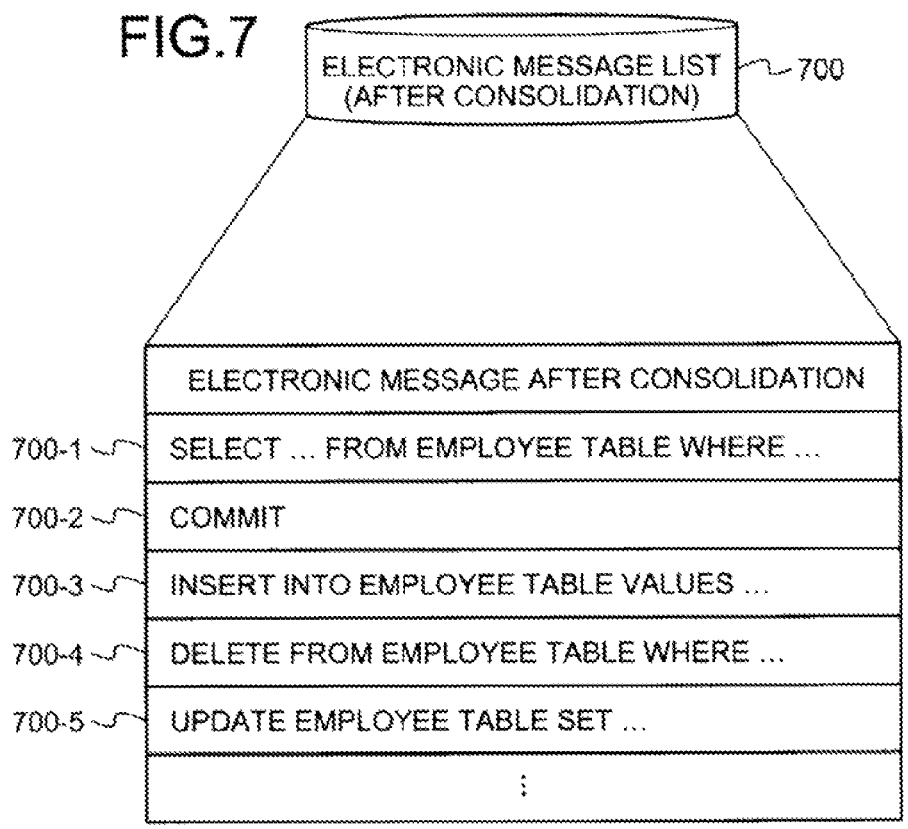
FIG. 7 is an explanatory diagram of an example of the contents of an electronic message list 700 obtained after consolidation.

FIG. 7 is an explanatory diagram of an example of the contents of the electronic message list 700 obtained after the consolidation. In FIG. 7, the electronic message list 700 obtained after the consolidation includes electronic messages obtained after the consolidation (for example, the electronic messages 700-1 to 700-5 obtained after the consolidation). The electronic message obtained after the consolidation represents the output result of the consolidation process executed for the electronic message and, for example, is the electronic message obtained after the conversion executed using the consolidation definitions of the consolidation definition list 600 depicted in FIG. 6.

For example, the electronic message 700-1 obtained after the consolidation is the electronic message obtained after the conversion that is acquired as a result of execution of the consolidation process applying the consolidation definition of the rule No. "1" in the consolidation definition list 600 to the electronic message of the electronic message information 500 depicted in FIG. 5. According to the electronic message 700-1 obtained after the consolidation, the statistical processing of the electronic message can be executed without being affected by, for example, condition designation "employee ID=1" and an item not handled as the purpose of the monitoring "employee No." that are included in the electronic message of the electronic message information 500.

The contents of a consolidation statistics list 800 used by the consolidation support apparatus 101 will be described. The consolidation statistics list 800 is realized by, for example, a storage apparatus such as, for example, the RAM 403, the magnetic dish 405, or the optical disk 407.

Figure 8:
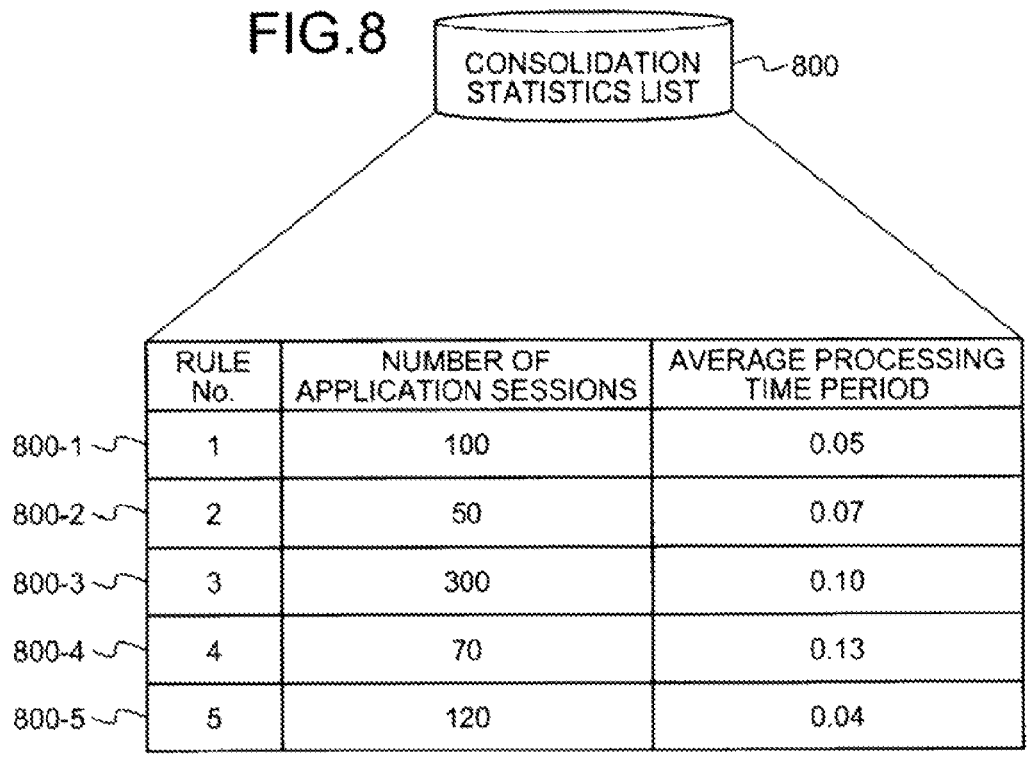
FIG. 8 is an explanatory diagram of an example of the contents of a consolidation statistics list 800.

FIG. 8 is an explanatory diagram of an example of the contents of the consolidation statistics list 800. In FIG. 8, the consolidation statistics list 800 has fields for "rule No.", "number of application sessions", and "average processing time period" and stores statistical information 800-1 to 800-5 as records by setting information in the fields.

In this list, the "rule No." is the identifier of a consolidation definition. The "number of application sessions" indicates the number of application sessions of a consolidation definition to the electronic messages, that is, the number of conversion sessions executed for the electronic messages using the consolidation definition that matches the electronic messages. The "average processing time period" indicates an average of the processing time periods consumed for the consolidation process executed for the electronic messages using the consolidation definitions. The unit of the average processing time period is, for example, "microsecond".

In this list, the average processing time period is an average of the processing time periods consumed when the consolidation definitions are applied to the electronic messages. For example, the statistical information 800-1 indicates the number of application sessions "100" of the consolidation definition of the rule No. "1" and the average processing time period "0.05 [microsecond]".

The average processing time period may be acquired including the processing time period consumed the consolidation process executed when no consolidation definition is applied to the electronic messages. The processing time period consumed the consolidation process executed when no consolidation definition is applied to the electronic messages, is the processing time period consumed for the matching process alone.

The contents of a consolidation restriction list 900 used by the consolidation support apparatus 101 will be described. The consolidation restriction list 900 is realized by, for example, a storage apparatus such as, for example, the RAM 403, the magnetic disk 405, or the optical disk 407.

Figure 9:
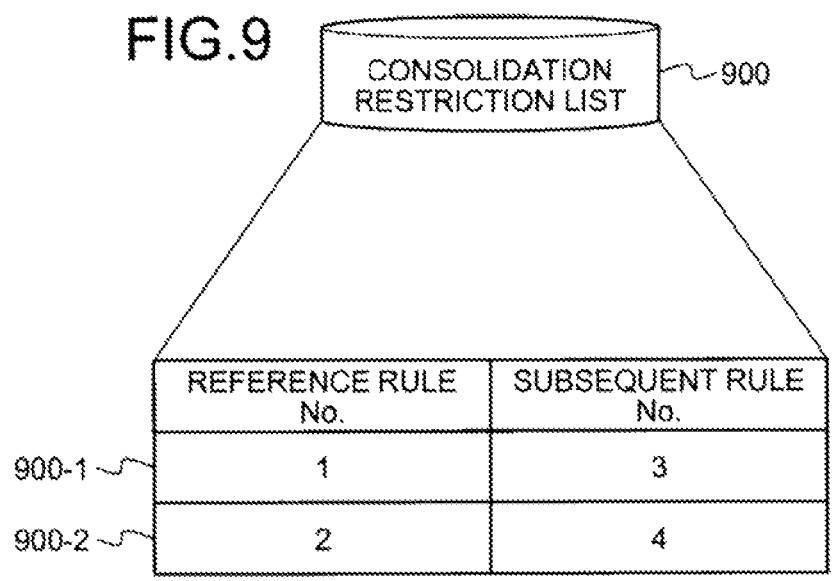
FIG. 9 is an explanatory diagram of an example of the contents of a consolidation restriction list 900.

FIG. 9 is an explanatory diagram of an example of the contents of the consolidation restriction list 900. In FIG. 9, the consolidation restriction list 900 has fields for "reference rule No." and "subsequent rule No." and stores restrictive condition information 900-1 and 900-2 as records by setting information in the fields.

The restrictive condition information 900-1 and 900-2 are information records that indicate the restrictive conditions of the selection sequence to be satisfied among the consolidation definitions in the consolidation definition list 600 depicted in FIG. 6. In the list, "the reference rule No." is the rule No. of reference consolidation definitions. The "subsequent rule No." is the rule No. of the consolidation definition whose selection sequence comes after that of the consolidation definition of the reference rule No.

For example, the restrictive condition information 900-1 indicates a restrictive condition that the selection sequence of the consolidation definition of the rule No. "3" comes after that of the consolidation definition of the rule No. "1". The restrictive condition information 900-2 indicates a restrictive condition that the selection sequence of the consolidation definition of the rule No. "4" comes after the selection sequence of the consolidation definition of the rule No. "2".

The contents of a revised consolidation definition list 1000 used by the consolidation support apparatus 101 will be described. The revised consolidation definition list 1000 is realized by, for example, a storage apparatus such as, for example, the RAM 403, the magnetic disk 405, or the optical disk 407.

FIG. 10 is an explanatory diagram of an example of the contents of the revised consolidation definition list 1000. In FIG. 10, the revised consolidation definition list 1000 is the consolidation definition list 600 depicted in FIG. 6 whose consolidation definitions are rearranged. For example, in the revised consolidation definition list 1000, the consolidation definitions in the consolidation definition list 600 are rearranged in order of decreasing number of application sessions that are to be applied to the electronic messages.

A functional configuration of the consolidation support apparatus 101 will be described. FIG. 11 is a block diagram of an example of a functional configuration of the consolidation support apparatus 101. In FIG. 11, the consolidation support apparatus 101 includes an acquiring unit 1101, a setting unit 1102, a selecting unit 1103, a converting unit 1104, a determining unit 1105, a storing unit 1106, a producing unit 1107, s determining unit 1108, a changing unit 1109, and an output unit 1110. The units from the acquiring unit 1101 to the output unit 1110 are functions forming a control unit and are implemented by, for example, executing on the CPU 401, programs stored in a storage apparatus such as, for example, the ROM 402, the RAM 403, the magnetic disk 405, or the optical disk 407 depicted in FIG. 4 or by using the I/F 409. The processing result of each of the functional units is stored in a storage apparatus such as, for example, the RAM 403, the magnetic disk 403, or the optical disk 407.

The acquiring unit 1101 has a function of acquiring the electronic messages transmitted and received among the apparatuses. The electronic messages are, for example, request electronic messages transmitted and received among the apparatuses in the system 200 depicted in FIG. 2. For example, the acquiring unit 1101 analyses the packets transmitted and received among the apparatuses in the system 200, re-configures an electronic message M1, and thereby, acquires the electronic message information 500 (see FIG. 5) that includes the electronic message M1. The acquiring unit 1101 may acquire the electronic message information 500 including the electronic message M1 transmitted and received among the apparatuses in the system 200 by user input via the keyboard 410 and the mouse 411 depicted in FIG. 4, or by extraction from the database.

The setting unit 1102 has a function of setting the selection sequence of the consolidation definitions. A consolidation definition is a rule to convert an electronic message by substituting with a specific value, a character string matching a specific pattern of the character strings included in the electronic message. The specific value is, for example, a word, a symbol, a null character, or a space. According to the consolidation definition, electronic messages can be converted into electronic messages of a form by which the identity of the electronic message can be determined.

Taking an example of the consolidation definition of the rule No. "1" in the consolidation definition list 600 depicted in FIG. 6 as an example, expression varieties between capital letters and small letters can be standardized by, for example, substituting "SELECT" or "select" included in the electronic messages with a specific value "SELECT". For example, information not targeted for monitoring in character strings included in an electronic message can be excluded by substituting a character string between "SELECT" and "FROM" included in the electronic message with a specific value For example, designation of an unnecessary condition by a character string included in an electronic message can be excluded by substituting the character string following after "WHERE" included in the electronic message with a specific value ". . . ".

The selection sequence of the consolidation definitions is the sequence in which the consolidation definitions are selected to be applied to the electronic messages from among the consolidation definitions. For example, the setting unit 1102 refers to the consolidation statistics list 800 depicted in FIG. 8 and sets the selection sequence of each of the consolidation definitions in the consolidation definition list 600.

For example, the setting unit 1102 may refer to the number of application sessions of the consolidation definitions in the consolidation statistics list 800 and may set the selection sequence of the consolidation-definitions in the consolidation definition list 600 to be in descending order of the number of application sessions. Thereby, the plural, consolidation definitions can be rearranged in descending order of the number of application sessions of applying the consolidation definitions to the electronic messages. As a result, the amount of processing for the matching process executed for the electronic messages can be reduced and the amount of processing of the overall consolidation processes can be reduced, whereby the processing time period consumed for the consolidation process can be reduced.

For example, the setting unit 1102 may refer to the average processing time periods of the consolidation definitions in the consolidation statistics list 800 and may set the selection sequence of the consolidation definitions in the consolidation definition list 600 to be in ascending order of average processing time period. Thereby, the plural consolidation definitions can be rearranged in ascending order of the processing time period consumed for each of the consolidation processes and reductions in the processing time period consume for the overall consolidation processes can be reduced.

The setting unit 1102 may set the selection sequence of the consolidation definitions in the consolidation definition list 600 by, for example, user input via the keyboard 410 and the mouse 411. The setting result set is reflected on, for example, the revised consolidation definition list 1000 depicted in FIG. 10.

The selecting unit 1103 has a function of selecting the consolidation definitions to be applied to an electronic message. For example, the selecting unit 1103 selects the consolidation definitions sequentially from the top in the consolidation definition list 600, and also selects the consolidation definitions sequentially from the top in the revised consolidation definition list 1000.

The converting unit 1104 has a function of converting an acquired electronic message, based on the consolidation definition selected. For example, the converting unit 1104 determines whether a character string is present that matches a specific pattern of the consolidation definition of the character strings included in the electronic message. When the converting unit 1104 determines that a character string is present that matches the specific pattern, the converting unit 1104 substitutes the character string matching the specific pattern with a specific value and thereby, converts the electronic message.

For example, the converting unit 1104 converts the acquired electronic message, based on the consolidation definition selected from the consolidation definition list 600. For example, the converting unit 1104 converts the acquired electronic message, based on the consolidation definition selected from the revised consolidation definition list 1000.

In the description below, the consolidation definitions that are selected sequentially from the top in the revised consolidation definition list 1000 are applied to an electronic message and as a result, the consolidation definition that first matches the electronic message may be expressed as a "first consolidation definition". The electronic message after the conversion based on the first consolidation definition may be expressed as "first electronic message".

The consolidation definitions are selected sequentially from the top in the consolidation definition list 600 and are applied to an electronic message. As a result, the consolidation definition that first matches the electronic message may be expressed as "second consolidation definition". The electronic message after the conversion based on the second consolidation definition may be expressed as "second electronic message". However, it is assumed that the second consolidation definition is a consolidation definition whose priority rank given thereto is higher than that of the first consolidation definition.

The determining unit 1105 has a function of determining whether the first electronic message and the second electronic message match each other. For example, the determining unit 1105 may compare character strings of the first electronic message and those of the second electronic message with each other and thereby, determine whether the first electronic message and the second electronic message match each other.

The storing unit 1106 has a function of storing to a storage apparatus, converted electronic messages after the conversion. For example, when the first electronic message and the second electronic message match each other, the storing unit 1106 stores the first or the second electronic message to the electronic message list 700 obtained after the consolidation depicted in FIG. 7.

The producing unit 1107 has a function of producing a restrictive condition to be satisfied by the selection sequence of each of the first consolidation definition and the second consolidation definition when the first electronic message and the second electronic message do not match each other. For example, when the first and the second electronic messages do not match each other, the producing unit 1107 produces a restrictive condition that the selection sequence of the first consolidation definition comes after the selection sequence of the second consolidation definition. An example of production of a restrictive condition will be described later with reference to FIG. 12.

When no electronic message identical to the first, electronic message is stored in the storage apparatus, the converting unit 1104 may convert the electronic message based on the second consolidation definition. For example, the converting unit 1104 determines whether an electronic message identical to the first electronic message is included in the electronic message list 700 obtained after the consolidation. When the converting unit 1104 determines that no electronic message identical to the first electronic message is included in the electronic message list 700 obtained after the consolidation, the converting unit 1104 converts the electronic message based on the second consolidation definition.

Thus, when the first electronic message is a new electronic message that is not present before, the conversion of the electronic message is executed based on the second consolidation definition and determination is executed as to the matching of the first and the second electronic messages with each other. Therefore, processing can be reduced such as unnecessary processing concerning the determination of the matching of the first and the second electronic messages with each other, which is already determined, and unnecessary processing to produce a restrictive condition identical to a restrictive condition already produced.

The determining unit 1108 has a function of determining whether the sequence relation between the selection sequence of the first consolidation definition and the selection sequence of the second consolidation definition among the selection sequences of the consolidation definitions of a consolidation definition group set satisfies the restrictive condition produced when the first and the second electronic messages do not match each other. For example, the determining unit 1108 determines that the restrictive condition is not satisfied when the selection sequence of the first consolidation definition precedes the selection sequence of the second consolidation definition.

The changing unit 1109 has a function of, when the restrictive condition is not satisfied, changing the selection sequence of the consolidation definitions of the consolidation definition group set, such that the selection sequence of the first consolidation definition comes after the selection sequence of the second consolidation definition. For example, the changing unit 1109 changes the selection sequence of the first consolidation definition to be immediately after the selection sequence of the second consolidation definition, and shifts backward accordingly the selection sequence of the consolidation definitions after the selection sequence of the first consolidation definition. For example, the changing unit 1109 may insert the consolidation definition information of the first consolidation definition in the revised consolidation definition list 1000, immediately beneath the consolidation definition information of the second consolidation definition.

Thereby, the selection sequence of the consolidation definitions in the revised consolidation definition list 1000 can be changed such that the same output result is acquired as that acquired when the consolidation process is executed for the electronic messages using the consolidation definition list 600. An example of change of the selection sequence will be described later with reference to FIGS. 13A, 13B, 14A and 14B.

When the selection sequences of the consolidation definitions of the consolidation definition group are changed, the selecting unit 1103 selects the consolidation definition used for the consolidation process executed for the electronic messages according to the selection sequences of the consolidation definitions of the consolidation definition group obtained after the change. For example, the selecting unit 1103 selects the consolidation definitions sequentially from the top in the revised consolidation definition list 1000 into which the consolidation definition information of the first consolidation definition is inserted immediately beneath the consolidation definition information of the second consolidation definition. As a result, the electronic messages are converted based on the consolidation definition selected according to the selection sequence of the consolidation definitions of the consolidation definition group obtained after the change.

The output unit 1110 has a function of outputting the restrictive condition produced. For example, the output unit 1110 may output the consolidation restriction list 900 depicted in FIG. 9. The form of the output of the output unit 1110 can be, for example, display on the display 408, output to the printer 413 for printing, transmission by the I/F 409 to an external apparatus, and storage in a storage area.

Thereby, at an arbitrary timing thereafter, the selection sequence of the consolidation definitions can be changed in the revised consolidation definition list 1000 such that the same output result is acquired as that acquired when the consolidation process is executed for the electronic messages using the consolidation definition list 600.

The output unit 1110 has a function of outputting an electronic message after the conversion. For example, when an electronic message identical to the first electronic message is stored in the electronic message list 700 obtained after the consolidation, the output unit 1110 outputs the first electronic message. When the first and the second electronic messages match each other, the output unit 1110 outputs any one among the first and the second electronic messages. When the first and the second electronic messages do not match each other, the output unit 1110 outputs the second electronic message.

Thus, even when the selection sequence of the consolidation definitions of the consolidation definition list 600 is changed, the same output result can be acquired as that acquired when the consolidation process is executed according to the priority ranks given to the consolidation definitions.

Taking an example of the electronic message information 500 that includes the electronic message HI depicted in FIG. 5, an example of production will be described of the restrictive condition to be satisfied by the selection sequence of the first consolidation definition and that of the second consolidation definition.

FIG. 12 is an explanatory diagram of an example of production of a restrictive condition. In FIG. 12, the electronic message M1 is a request electronic message transmitted and received among the apparatuses in the system 200. In this case, the consolidation definitions are selected sequentially from the top in the consolidation definition list 600 and are applied to the electronic message M1 and as a result, the consolidation definition first matching the electronic message M1 is set to be the consolidation definition of the rule No. "1". An electronic message 1201 is the electronic message after the conversion acquired by converting the electronic message M1 based on the consolidation definition of the rule No. "1" (that corresponds to the above second electronic message).

The consolidation definitions are selected sequentially from the top in the revised consolidation definition list 1000 and are applied to the electronic message M1 and as a result, the consolidation definition first matching with the electronic message M1 is set to be the consolidation definition of the rule No. "5". An electronic message 1202 is the electronic message after the conversion acquired by converting the electronic message M1 based on the consolidation definition of the rule No. "5" (that corresponds to the above first electronic message).

In this case, the determining unit 1105 compares the character strings of the electronic messages 1201 and 1202 with each other and thereby, determines that the electronic messages 1201 and 1202 do not match each other. The producing unit 1107 produces a restrictive condition to be satisfied by the selection sequence of the consolidation definition of the rule No. "1" and that of the consolidation definition of the rule No. "5".

For example, the setting unit 1107 sets the rule No. "1" to be the reference rule No. of the consolidation restriction list 900 and sets the rule No. "5" to be the corresponding subsequent rule No. Thereby, a restrictive condition can be produced that the selection sequence of the consolidation definition of the rule No. "5" comes after the selection sequence of the consolidation definition of the rule No. "1".

An example of change of the selection sequence of the consolidation definitions will be described taking an example of the consolidation restriction list 900 depicted in FIG. 9 and the revised consolidation definition list 1000 depicted in FIG. 10.

FIGS. 13A, 13B, 14A, and 14B are explanatory diagrams of an example of a change of the selection sequence of the consolidation definitions. In FIG. 13A, the revised consolidation definition list 1000 is depicted that is acquired by rearranging the consolidation definitions in the consolidation definition list 600 in order of decreasing number of application sessions of the consolidation statistics list 800 depicted in FIG. 8.

In FIG. 13A, the determining unit 1108 selects the consolidation definitions sequentially from the top in the revised consolidation definition list 1000 and determines whether the rule No. selected is set to be the reference rule No. of the consolidation restriction list 900. In this case, the determining unit 1108 selects the consolidation definition of the rule No. "1" and as a result, determines that the rule No. is set to be the reference rule No. of the consolidation restriction list 900.

The determining unit 1108 determines whether, in the revised consolidation definition list 1000, the consolidation definition of a subsequent rule No. corresponding to the reference rule No. is present in a line higher than that of the consolidation definition of the reference rule No. At this time, the consolidation definition of the subsequent rule No. "3" is present in a line higher than that of the consolidation definition of the reference rule No. "1". In this case, the determining unit 1108 determines that the sequence relation does not satisfy the restrictive condition between the selection sequence of the consolidation definition of the rule No. "1" and that of the consolidation definition of the rule No. "3".

In FIG. 13B, when the restrictive condition is not satisfied, the changing unit 1109 changes the selection sequence of the consolidation definitions such that the selection sequence of the consolidation definition of the rule No. "3" comes after that of the consolidation definition of the rule No. "1". In this case, the consolidation definition information 600-3 of the consolidation definition of the rule No. "3" is inserted immediately beneath the consolidation definition information 600-1 of the consolidation definition of the rule No. "1".

In FIG. 14A, the determining unit 1108 selects unselected consolidation definitions sequentially from the top of the revised consolidation definition list 1000 and determines whether the selected rule No. is set to be the reference rule No. of the consolidation restriction list 900. In this case, the determining unit 1108 selects the consolidation definition of the rule No. "2" and as a result, determines that the rule No. is set to be the reference rule No. of the consolidation restriction list 900.

The determining unit 1108 determines whether, in the revised consolidation definition list 1000, the consolidation definition of the subsequent rule No. corresponding to the reference rule No. is present in a line higher than that of the consolidation definition of the reference rule No. At this time, the consolidation definition of the subsequent rule No. "4" is present in a line higher than that of the consolidation definition of the reference rule No. "2". In this case, the determining unit 1108 determines that the sequence relation does not satisfy the restrictive condition between the selection sequence of the consolidation definition of the rule No. "2" and that of the consolidation definition of the rule No. "4".

In FIG. 14B, when the restrictive condition is not satisfied, the changing unit 1109 changes the selection sequence of the consolidation definitions such that the selection sequence of the consolidation definition of the rule No. "4" comes after that of the consolidation definition of the rule No. "2". In this case, the consolidation definition information 600-4 of the consolidation definition of the rule No. "4" is inserted immediately beneath the consolidation definition information 600-2 of the consolidation definition of the rule No. "2".

In this manner, the selection sequence of the consolidation definitions is changed according to the consolidation restriction list 900 and thereby, the selection sequence of the consolidation definitions in the revised consolidation definition list 1000 can be changed such that the same output result can be acquired as that acquired when the consolidation definition list 600 is used.

A consolidation support process procedure executed by the consolidation support apparatus 101 will be described.

FIG. 15 is a flowchart of an example of the consolidation support process procedure of the consolidation support apparatus 101. In the flowchart of FIG. 15, the consolidation support apparatus 101 first determines whether the consolidation support apparatus 101 has acquired an electronic message transmitted and received among the apparatuses in the system 200 (step S1501). The consolidation support apparatus 101 waits for acquisition of the electronic message (step S1501: NO).

When the consolidation support apparatus 101 acquires an electronic message (step S1501: YES), the consolidation support apparatus 101 executes a first consolidation process using the revised consolidation definition list 1000 (step S1502). The consolidation support apparatus 101 determines whether the electronic message list 700 obtained after the consolidation includes an electronic message identical to the electronic message after the conversion (step S1503).

When the consolidation support apparatus 101 determines that the electronic message list 700 obtained after the consolidation includes an identical electronic message (step S1503: YES), the consolidation support apparatus 101 increments the number of application sessions of the first consolidation definition in the consolidation statistics list 800 (step S1504). The first consolidation definition is the consolidation definition that first matches the electronic message, among the consolidation definitions in the revised consolidation definition list 1000.

The consolidation support apparatus 101 outputs the first electronic message that represents the consolidation result of the first consolidation process (step S1505) and the series of process steps according to the flowchart comes to an end. The first electronic message is the electronic message obtained after the conversion by converting the electronic message acquired based on the first consolidation definition.

If the consolidation support apparatus 101 determines at step S1503 that the electronic message list 700 obtained after the consolidation does not include an identical electronic message (step S1503: NO), the consolidation support apparatus 101 executes a second consolidation process using the consolidation definition list 600 (step S1506).

The consolidation support apparatus 101 determines whether the first and the second electronic messages match each other (step S1507). The second electronic message is the electronic message obtained after converting the acquired electronic message based on the second consolidation definition. The second consolidation definition is the consolidation definition that first matches the electronic message of the consolidation definitions in the consolidation definition list 600.

If the consolidation support apparatus 101 determines that the first and the second electronic, messages match each other (step S1507: YES), the consolidation support apparatus 101 stores the first electronic message to the electronic message list 700 obtained after the consolidation (step S1508). The consolidation support apparatus 101 increments the number of application sessions of the first consolidation definition of the consolidation statistics list 800 (step S1509). The consolidation support apparatus 101 outputs the first electronic message that represents the consolidation result of the first consolidation process (step S1510) and the series of process steps according to the flowchart comes to an end.

If the consolidation support apparatus 101 determines at step S1507 that the first and the second electronic messages do not match each other (step S1507: NO), the consolidation support apparatus 101 increments the number of application sessions of the second consolidation definition in the consolidation statistics list 800 (step S1511). The consolidation support apparatus 101 outputs the second electronic message that represents the consolidation result of the second consolidation process (step S1512).

The consolidation support apparatus 101 sets the rule No. of the second consolidation definition to be the reference rule No. in the consolidation restriction list 900 (step S1513). Thereby, new restrictive condition information is stored as a record in the consolidation restriction list 900. The consolidation support apparatus 101 sets the rule No. of the first consolidation definition to be the corresponding subsequent rule No. in the consolidation restriction list 900 (step S1514).

The consolidation support apparatus 101 refers to the consolidation restriction list 300 and executes an update process on the revised consolidation definition list 1000 (step S1515) and the series of process steps according to the flowchart comes to an end.

If the rule No. of the second consolidation definition is already set to be the reference rule No. in the consolidation restriction list 300 at step S1513, the consolidation support apparatus 101 may ship step S1513. If the rule No. of the first consolidation definition is already set to be the corresponding subsequent rule No. in the consolidation restriction list 900 at step S1514, the consolidation support apparatus 101 may ship step S1514.

At steps S1504 and S1509, the consolidation support apparatus 101 may calculate the average processing time period of the first consolidation definition and may update the average processing time period of the first consolidation definition in the consolidation statistics list 800. At step S1511, the consolidation support apparatus 101 may calculate the average processing time period of the second consolidation definition and may update the average processing time period of the second consolidation definition in the consolidation statistics list 800.

Thereby, an output result of the consolidation process intended by the user can be acquired and reduction of the processing time period consumed for the consolidation process can be facilitated.

A process procedure of the first consolidation process at step S1502 depicted in FIG. 15 will be described.

FIG. 16 is a flowchart of an example of the process procedure of the first consolidation process. In the flowchart of FIG. 16, the consolidation support apparatus 101 first selects unselected consolidation definitions sequentially from the top in the revised consolidation definition list 1000 (step S1601).

The consolidation support apparatus 101 determines whether the consolidation definition selected matches the electronic message acquired at step S1501 depicted in FIG. 15 (step S1602). At this time, if the consolidation support apparatus 101 determines that the consolidation definition selected matches the electronic message (step S1602: YES), the consolidation support apparatus 101 converts the electronic message acquired into the first electronic message by substituting a character string matching a specific pattern of the character strings included in the electronic message acquired, with a specific value based on the consolidation definition selected (step S1603). The processing by the consolidation support apparatus 101 returns to the process step at which the first consolidation process is invoked.

If the consolidation support apparatus 101 determines at step S1602 that the consolidation definition selected does not match the electronic message (step S1602: NO), the consolidation support apparatus 101 determines whether any unselected consolidation definition that has not been selected from the revised consolidation definition list 1000 is present (step S1604). At this time, if the consolidation support apparatus 101 determines that an unselected consolidation definition is present (step S1604: YES), the processing by the consolidation support apparatus 101 returns to step S1601.

On the other hand, if the consolidation support, apparatus 101 determines that no unselected consolidation definition is present (step S1604: NO), the processing by the consolidation support apparatus 101 returns to the process step at which the first consolidation process is invoked. In this case, the electronic message acquired at step S1501 depicted in FIG. 15 may be set to be the first electronic message.

Thereby, the consolidation definitions in the revised consolidation definition list 1000 can be selected sequentially from the top and the electronic message can be converted into the first electronic message based on the consolidation definition that first matches with the electronic message.

The process procedure of the second consolidation process executed at step S1506 depicted in FIG. 15 is same as the specific process procedure of the first consolidation process and will not again be described.

A process procedure will be described of the update process of the revised consolidation definition list 1000 executed at step S1515 depicted in FIG. 15.

FIG. 17 is a flowchart of an. example of the process procedure of the update process of the revised consolidation definition list 1000. In the flowchart of FIG. 17, the consolidation support apparatus 101 first refers to the consolidation statistics list 800 and produces the revised consolidation definition list 1000 by rearranging the consolidation definitions in the consolidation definition list 600 in descending order of the number of application sessions (step S1701).

The consolidation support apparatus 101 selects the unselected consolidation definitions sequentially from the top line in the revised consolidation definition list 1000 produced (step S1702) and determines whether the rule No. of the selected consolidation definition is set to be the reference rule No. that is in the consolidation restriction list 900 (step S1703).

In this case, if the consolidation support apparatus 101 determines that the rule No. is not set to be the reference rule No. (step S1703: NO), the procedure progresses to step S1707. On the other hand, if the consolidation support apparatus 101 determines that the rule No. is set to be the reference rule No. (step S1703: YES), the consolidation support apparatus 101 identifies the rule No. of the consolidation definition in a line higher than that of the consolidation definition selected, in the revised consolidation definition list 1000 (step S1704).

The consolidation support apparatus 101 determines whether the identified rule No. is set to be a subsequent rule No. that corresponds to the reference rule No. in the consolidation restriction list 900 (step S1705). If the consolidation support apparatus 101 determines that the identified rule No. is not set to be a subsequent rule No. (step S1705: NO), the procedure progresses to step S1707.

On the other hand, if the consolidation support apparatus 101 determines that the identified rule No. is set to be a subsequent rule No. (step S1705: YES), the consolidation support apparatus 101 inserts the consolidation definition information of the consolidation definition of the rule No. set to be the subsequent rule No. in a line beneath the consolidation definition information of the consolidation definition of the rule No. set to be the selected reference rule No., into the revised consolidation definition list 1000 (step S1706).

The consolidation support apparatus 101 determines whether any unselected consolidation definition is present in the revised consolidation definition list 1000 (step S1707). If the consolidation support apparatus 101 determines that an unselected consolidation definition is present (step S1707: YES), the procedure returns to step S1702. On the other hand, if the consolidation support apparatus 101 determines that no unselected consolidation definition is present (step S1707: NO), the processing by the consolidation support apparatus 101 returns to the process step at which the update process is invoked for the revised consolidation definition list 1000.

Thereby, the selection sequence of the consolidation definitions in the revised consolidation definition list 1000 can be optimized satisfying the restrictive condition of the sequence relation among the consolidation definitions by which the same output result can be acquired as that of the consolidation process executed using the consolidation definition list 600.

In the description, in the update process of the revised consolidation definition list 1000, the consolidation support apparatus 101 produces the revised consolidation definition list 1000 at each time. However, the production he revised consolidation definition list 1000 is not limited hereto. For example, the consolidation support apparatus 101 may produce a new revised consolidation definition list 1000 when a predetermined time period (for example, one day or one week) elapses or when any change is made to a rank of the number of application sessions in the consolidation statistics list 800.

Preferably, the consolidation support process of the consolidation support apparatus 101 is executed, for example, after the consolidation is executed and when specific information is accumulated in the electronic message list. 700 obtained after the consolidation and the consolidation statistics list 800. For example, the consolidation support process may be executed when the total number of application sessions in the consolidation statistics list 800 reaches or exceeds a specific number; may be executed, for example, when a specific number of or more electronic messages obtained after the consolidation are stored in the electronic message list 700 obtained after the consolidation; and may be executed, for example, when no registration of any new electronic message occurs to the electronic message list 700 obtained after the consolidation, for a specific time period.

As described, according to the consolidation support apparatus 101 according to the embodiment, the consolidation support apparatus 101 can acquire an electronic message transmitted and received among the apparatuses in the system 200 and can convert the acquired electronic message into the first electronic message based on the first consolidation definition selected from the revised consolidation definition list 1000. According to the consolidation support apparatus 101, the consolidation support apparatus 101 can convert the acquired electronic message into the second electronic message based on the second consolidation definition whose priority rank given thereto is higher than that of the first consolidation definition, selected from the consolidation definition list 600. According to the consolidation support apparatus 101, when the first and the second electronic messages do not match each other, the consolidation support apparatus 101 can produce the restrictive condition that the selection sequence of the first consolidation definition comes after the selection sequence of the second consolidation definition.

Thereby, the sequence relation between the first and the second consolidation definitions can be identified by which the output result of the consolidation process is not changed even when the application sequence is changed of the consolidation definitions in the consolidation definition list 600.

According to the consolidation support apparatus 101, the consolidation support apparatus 101 can set the selection sequence of the consolidation definitions in the consolidation definition list 600 and can determine whether the sequence relation between the selection sequence of the first consolidation definition and the selection sequence of the second consolidation definition of the selection sequence set for the consolidation definitions satisfies the restrictive condition produced. According to the consolidation support apparatus 101, when the restrictive condition is not satisfied, the consolidation support apparatus 101 can change the selection sequence of the consolidation definitions such that the selection sequence of the first consolidation definition comes after that of the second consolidation definition.

Thereby, the selection sequence of the consolidation definitions in the revised consolidation definition list 1000 can be changed such that the output result of the consolidation process is not changed.

According to the consolidation support apparatus 101, the consolidation support apparatus 101 can select a consolidation definition from the revised consolidation definition list 1000 according to the selection sequence of the consolidation definitions after the change and can convert the acquired electronic message based on the selected consolidation definition. Thereby, even when the selection sequence of the consolidation definitions in the consolidation definition list 600 is changed, the same output result as that before the change can be acquired.

According to the consolidation support apparatus 101, when the first and the second electronic messages match each other, the consolidation support apparatus 101 can store the first or the second electronic message in the electronic message list 700 obtained after the consolidation. According to the consolidation support apparatus 101, the consolidation support apparatus 101 can convert a new electronic message into the first electronic message based on the first consolidation definition selected from the revised consolidation definition list 1000 and can determine whether the electronic message list 700 obtained after the consolidation includes an electronic message identical to the first electronic message. According to the consolidation support apparatus 101, when the consolidation support apparatus 101 determines that the electronic message list 700 obtained after the consolidation includes no electronic message identical to the first electronic message, the consolidation support apparatus 101 can convert the new electronic message into the second electronic message based on the second consolidation definition selected from the consolidation definition list 600.

Thereby, when the first electronic message is a new electronic message that is not present before, the consolidation support apparatus 101 can convert the electronic message into the second electronic message based on the second consolidation definition and can determine whether the first and the second electronic messages match each other. As a result, processing can be reduced such as unnecessary processing concerning the determination of the matching of the first and the second electronic messages with each other that is already determined, and unnecessary processing to produce an restrictive condition identical to a restrictive condition already produced.

According to the consolidation support apparatus 101, the consolidation support apparatus 101 can refer to the number of application sessions of the consolidation definitions in the consolidation statistics list 600 and can set the selection sequence of the consolidation definitions in the consolidation definition list 600 to be in descending order of the number of application sessions. Thereby, the consolidation support apparatus 101 can change the selection sequence of the consolidation definitions in the revised consolidation definition list 1000, thereby facilitating reductions in the processing time period consumed for the consolidation process by which the output result of the consolidation process is not changed.

According to the consolidation support apparatus 101, the consolidation support apparatus 101 can refer to the average processing time period of the consolidation definitions in the consolidation statistics list 600 and can set the selection sequence of the consolidation definitions in the consolidation definition list 600 to be in ascending order of average processing time period. Thereby, the consolidation support apparatus 101 can change the selection sequence of the consolidation definitions in the revised consolidation definition list 1000 facilitating reductions in the processing time period consumed for the consolidation process by which the output result of the consolidation process is not changed.

In light of the above, according to the consolidation support program, the consolidation support method, and the consolidation support apparatus, the selection sequence of the consolidation definitions can be optimized satisfying the restrictive condition of the sequence relation among the consolidation definitions with which the same output result cars be acquired as that of the consolidation process executed using the consolidation definition list 600. As a result, an output result of the consolidation process intended by a user can be acquired and reductions in the processing time period consumed for the consolidation process can be facilitated.

The consolidation support method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to an aspect of the present invention, an effect is achieved in that sequence relations among consolidation definitions for which the output result of the consolidation process does not change even when the sequence in which the consolidation definitions are applied changes, can be identified.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a consolidation support program that causes a computer to execute a process comprising:

acquiring an electronic message transmitted and received among apparatuses;

setting, for a plurality of consolidation rules of a consolidation rule group, a second consolidation sequence based on priority ranks given to each of the consolidation rules to acquire an output result as intended by a user of a consolidation process, and a first consolidation sequence for each of the consolidation rules different from the second consolidation sequence;

converting the acquired electronic message into a first electronic message based on a first consolidation rule according to the first consolidation sequence, by substituting a character string with a value, the character string matching a pattern and being among character strings included in the acquired electronic message;

converting the acquired electronic message into a second electronic message based on a first consolidation rule according to the second consolidation sequence, by substituting a character string with a value, the character string matching a pattern and being among character strings included in the acquired electronic message;

determining whether the first and the second electronic messages match each other;

producing, when the first and the second electronic messages do not match each other, a restrictive condition specifying that the first consolidation rule according to the first consolidation sequence comes after the first consolidation rule according to the second consolidation sequence; and setting a selection sequence for each of the consolidation rules in the consolidation rule group, the setting of the selection sequence includes setting the selection sequence for each of the consolidation rules in the consolidation rule group, based on an application session count for each of the consolidation rules that are applied to the electronic messages and in the consolidation rule group.

2. The non-transitory computer-readable recording medium according to claim 1, the process further comprising:

determining among the selection sequence of the consolidation rules in the consolidation rule group, whether the produced restrictive condition is satisfied by a sequence relation between the selection sequence of the first consolidation rule and the selection sequence of the second consolidation rule; and changing when the restrictive condition is not satisfied, the selection sequence of each of the consolidation rules of the consolidation rule group such that the selection sequence of the first consolidation rule comes after the selection sequence of the second consolidation rule.

3. The non-transitory computer-readable recording medium according to claim 2, the process further comprising:

selecting a consolidation rule from the consolidation rule group, according to the selection sequence of each of the consolidation rules of the consolidation rule group after the changing;

converting the acquired electronic message, based on the selected consolidation rule; and outputting the electronic message after the converting.

4. The non-transitory computer-readable recording medium according to claim 3, the process further comprising:

storing to a storing unit, the output electronic message after the converting;

acquiring a new electronic message transmitted and received among the apparatuses;

converting the new electronic message acquired into the first electronic message based on the first consolidation rule;

converting when no electronic message identical to the first electronic message is stored in the storing unit, the acquired new electronic message into the second electronic message based on the second consolidation rule having a priority rank that is higher than a priority rank of the first consolidation rule;

determining whether the first and the second electronic messages match each other; and producing when the first and the second electronic messages do not match each other, a restrictive condition that the selection sequence of the first consolidation rule comes after the selection sequence of the second consolidation rule.

5. The non-transitory computer-readable recording medium according to claim 2, wherein the setting of the selection sequence includes setting the selection sequence for each of the consolidation rules in the consolidation rule group, based on processing time periods consumed to execute a converting process on the electronic message, based on the consolidation rules in the consolidation rule group, respectively.

6. A consolidation support method executed by a computer, the consolidation support method comprising:

acquiring an electronic message transmitted and received among apparatuses;

setting, for a plurality of consolidation rules of a consolidation rule group a second consolidation sequence based on priority ranks given to each of the consolidation rules to acquire an output result as intended by a user of a consolidation process, and a first consolidation sequence for each of the consolidation rules different from the second consolidation sequence;

converting the acquired electronic message into a first electronic message based on a first consolidation rule according to the first consolidation sequence, by substituting a character string with a value, the character string matching a pattern and being among character strings included in the acquired electronic message;

converting the acquired electronic message into a second electronic message based on a first consolidation rule according to the second consolidation sequence, by substituting a character string with a value, the character string matching a pattern and being among character strings included in the acquired electronic message;

determining whether the first and the second electronic messages match each other;

producing, when the first and the second electronic messages do not match each other, a restrictive condition specifying that the first consolidation rule according to the first consolidation sequence comes after the first consolidation rule according to the second consolidation sequence; and setting a selection sequence for each of the consolidation rules in the consolidation rule group, the setting of the selection sequence includes setting the selection sequence for each of the consolidation rules in the consolidation rule group, based on an application session count for each of the consolidation rules that are applied to the electronic messages and in the consolidation rule group.

7. A consolidation support apparatus comprising a processor configured to:

acquire an electronic message transmitted and received among apparatuses;

set, for a plurality of consolidation rules of a consolidation rule group a second consolidation sequence based on priority ranks given to each of the consolidation rules to acquire an output result as intended by a user of a consolidation process, and a first consolidation sequence for each of the consolidation rules different from the second consolidation sequence;

convert the acquired electronic message into a first electronic message based on a first consolidation rule according to the first consolidation sequence, by substituting a character string with a value, the character string matching a pattern and being among character strings included in the acquired electronic message;

convert the acquired electronic message into a second electronic message based on a first consolidation rule according to the second consolidation sequence, by substituting a character string with a value, the character string matching a pattern and being among character strings included in the acquired electronic message;

determine whether the first and the second electronic messages match each other;

produce, when the first and the second electronic messages do not match each other, a restrictive condition specifying that the first consolidation rule according to the first consolidation sequence comes after the first consolidation rule according to the second consolidation sequence; and setting a selection sequence for each of the consolidation rules in the consolidation rule group, the setting of the selection sequence includes setting the selection sequence for each of the consolidation rules in the consolidation rule group, based on an application session count for each of the consolidation rules that are applied to the electronic messages and in the consolidation rule group.

* * * * *